United States Patent
Juikar et al.

(10) Patent No.: US 8,993,671 B2
(45) Date of Patent: Mar. 31, 2015

(54) POLY(ALIPHATIC ESTER)-POLYCARBONATE COPOLYMER/POLYLACTIC ACID BLEND

(75) Inventors: Vishvajit Chandrakant Juikar, Banagalore (IN); Sriram Krishnamurthy, Chennai (IN); Gautam Chatterjee, Bangalore (IN); Robert Dirk van de Grampel, Tholen (NL)

(73) Assignee: Sabic Global Technolgies B.V. (NL)

( * ) Notice: Subject to any disclaimer, the term of this patent is extended or adjusted under 35 U.S.C. 154(b) by 572 days.

(21) Appl. No.: 13/363,819

(22) Filed: Feb. 1, 2012

(65) Prior Publication Data
US 2013/0137804 A1    May 30, 2013

(30) Foreign Application Priority Data
Nov. 24, 2011    (IN) .......................... 3365/DEL/2011

(51) Int. Cl.
*C08K 3/40* (2006.01)
*C08K 5/51* (2006.01)
*C08L 69/00* (2006.01)

(52) U.S. Cl.
CPC .................. *C08L 69/005* (2013.01)
USPC ......................... 524/494; 524/153

(58) Field of Classification Search
USPC ....................................... 524/494
See application file for complete search history.

(56) References Cited

U.S. PATENT DOCUMENTS

| 3,516,968 | A | 6/1970 | Moore et al. |
| 6,262,184 | B1 * | 7/2001 | Kanamori et al. ............ 525/411 |
| 7,112,644 | B2 | 9/2006 | Morishita et al. |
| 7,244,804 | B2 | 7/2007 | Ikeda et al. |
| 7,504,452 | B2 | 3/2009 | Hayata et al. |
| 2010/0041831 | A1 | 2/2010 | Chung et al. |
| 2010/0056700 | A1 | 3/2010 | Chung et al. |
| 2010/0129649 | A1 | 5/2010 | Malinoski et al. |
| 2010/0160559 | A1 | 6/2010 | Lee et al. |
| 2010/0168370 | A1 | 7/2010 | Hatano et al. |

FOREIGN PATENT DOCUMENTS

JP    2009172639 A1    8/2009

OTHER PUBLICATIONS

Japanese Patent No. 2009172639 (A); Publication Date: Aug. 6, 2009; Machine Translation; 12 Pages.
International Search Report; International Application No. PCT/IB2012/056419; International Filing Date: Nov. 14, 2012; Date of Mailing: Mar. 15, 2013; 4 Pages.
Written Opinion of the International Search Report; International Application No. PCT/IB2012/056419; International Filing Date: Nov. 14, 2012; Date of Mailing: Mar. 15, 2013; 4 Pages.

* cited by examiner

*Primary Examiner* — Hui Chin
(74) *Attorney, Agent, or Firm* — Cantor Colburn LLP

(57) ABSTRACT

The present invention is directed to a blended composition comprising one or more polycarbonates wherein at least one of the polycarbonates is a polyesterpolycarbonate having at least one unit derived from a soft block ester unit, e.g., sebacic acid, and at least one unit derived from bisphenol A, and a polylactic polymer wherein the composition has an overall biocontent of at least 10% according to ASTMD6866.

44 Claims, No Drawings

POLY(ALIPHATIC ESTER)-POLYCARBONATE COPOLYMER/POLYLACTIC ACID BLEND

CROSS REFERENCE TO RELATED APPLICATIONS

This application claims priority to Indian Patent Application No. 3365/DEL/2011, filed Nov. 24, 2011, and which is hereby incorporated by reference in its entirety.

FIELD OF THE INVENTION

The present disclosure relates to the development and use of polylactic acid containing copolymers/compositions and their formation of articles with desirable impact strengths.

BACKGROUND OF THE INVENTION

Aliphatic polyester polymers such as polylactic acid (PLA) based polymers are desired for their excellent porosity and decomposition characteristics. These bio-based polymers however lack formability, mechanical strength, and heat resistance. Since polylactic acid polymers have a low resistance against high temperature, a molded product can be distorted at 60° C. or higher.

Polylactic acid polymer resins have been blended with petroleum-based thermoplastics such as polycarbonate resins, but the addition of the PLA makes articles derived from the blends brittle. In addition, the polycarbonate/polylactic acid blends have low compatibility as these blends have low flow marks and continued impact strength issues.

Based on these demands, there exists a need for a polymer/thermoplastic material that meets impact strength requirements, e.g., improved toughness and ductility, but also having high biocontent without necessarily the need for impact modifiers.

SUMMARY OF INVENTION

The present disclosure is directed to a blended composition comprising (a) one or more polycarbonates wherein at least one of the polycarbonates is a poly(aliphatic ester)-polycarbonate comprising (i) soft block ester units of the formula

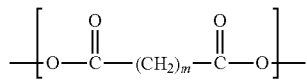

wherein m is 4 to 40 and (ii) at least one unit is derived from bisphenol A; and (b) a polylactide polymer having the following structural unit

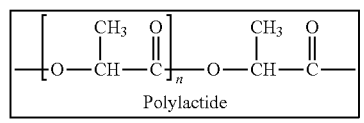

wherein n is between 1000 and 3000;
wherein the composition has an overall biocontent of at least 10% according to ASTM D6866.

The present disclosure is also directed to a blended composition comprising (a) one or more polycarbonates wherein at least one of the polycarbonates is a poly(aliphatic ester)-polycarbonate comprising (i) soft block ester units of the formula

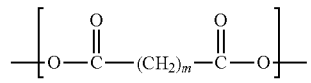

wherein m is 4 to 40, more specifically 4 to 18, and even more specifically 8 to 10; (ii) at least one unit derived from sebacic acid; and (iii) at least one unit derived from bisphenol A; and (b) a polylactide polymer having the following structural unit

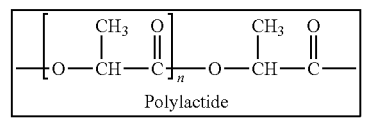

wherein n is 1000 to 3000; wherein the composition has an overall biocontent of at least 10% according to ASTM D6866, wherein the sebacic acid derived polycarbonate biocontent is at least 5% according to ASTM D6866, wherein the composition comprises 75 to 95 weight % poly(aliphatic ester)-polycarbonate, and wherein the composition comprises 5 to 45 weight % of polylactide polymer. The soft block ester has a glass transition temperature of 120 to 140° C., and comprises 2 to 10 weight % soft block ester units.

At least one poly(aliphatic ester)-polycarbonate containing sebacic acid has (a) a molecular weight of 16,000 to 27,000 g/mole ($^{+/-}$1000 g/mole) as measured by gel permeation chromatography using bisphenol A polycarbonate standards and 5.0 mole % (of the total composition) to 7.0 mole % sebacic acid (of the total composition); or (b) a molecular weight of 30,000 to 42,000 g/mole [$^{+/-}$1000 g/mole] as measured by gel permeation chromatography using bisphenol A polycarbonate standards, and 7.0 mole % to 9.0 mole % sebacic acid. Alternatively, at least one poly(aliphatic ester)-polycarbonate of (a) is at a molecular weight of 19,000 to 24,000 g/mole [$^{+/-}$1000 g/mole] as measured by gel permeation chromatography using bisphenol A polycarbonate standards. Alternatively, at least one poly(aliphatic ester)-polycarbonate of (b) is at a molecular weight of 33,000 to 39,000 g/mole [$^{+/-}$1000 g/mole] as measured by gel permeation chromatography using bisphenol A polycarbonate standards. The poly(aliphatic ester)-polycarbonates of the composition contains less than 5 mole percent of anhydride as determined by proton nuclear magnetic resonance.

The polylactide content of the composition may be 5 to 25 weight % of (a) and (b), and a molecular weight of: 100,000 to 300,000 g/mole [$^{+/-}$1000 g/mole], 150,000 to 250,000 g/mole [$^{+/-}$1000 g/mole], or 175,000 to 225,000 g/mole [$^{+/-}$1000 g/mole] as measured by gel permeation chromatography using polystyrene standards. The polylactide content of the composition may be 5 to 25 weight % of (a) and (b), and a molecular weight of 160,000 g/mole to 200,000 g/mole [$^{+/-}$1000 g/mole] as measured by gel permeation chromatography using polystyrene standards. The polylactide may have a melting point (Tm) of 165° C. [$^{+/-}$10° C.] and a glass transition temperature of 60° C. [$^{+/-}$10° C.]. The composition may have a melt volume rate of: 28 cm³/10 minutes to 35 cm³/10 minutes according to ISO1133 (5 kg/5 minutes at 240° C.), 2.50 cm³/10 minutes to 6.50 cm³/10 minutes according to ISO1133 (5 kg/5 minutes at 240° C.), or 7.50 cm³/10 minutes to 18.00 cm³/10 minutes according to ISO1133 (5 kg/5 minutes at 240° C.). The composition may have an impact strength of greater than 50 or greater than 60 kJ/m² [+/−5 kJ/m²] at 23° C. according to ISO 180 or greater than 85 kJ/m² [+/−5 kJ/m²] at 10° C. according to ISO 180. The composition may further have an overall biocontent of at least: 15%, 20%, or 30% according to ASTM D6866. The composition may further comprise other additives such as heat stabilizers, mold release agents, glass, or colorants.

The present invention may be an article formed from the composition, wherein the composition has an overall biocontent of 10 to 30% according to ASTM D6866.

The article may be a computer or business machine housing, a housing for a hand-held electronic device, a component of a lighting fixture or home appliance, a component of a medical application or device, or a component of an interior or exterior component of an automobile.

The present invention is also directed to a blended composition comprising (a) a poly(aliphatic ester)-polycarbonate comprising (i) soft block ester units of the formula

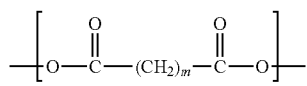

wherein m is 4 to 40, more specifically 4 to 18; (ii) at least one unit derived from sebacic acid; (iii) and at least one unit derived from bisphenol A; and (b) a polylactide polymer having the following structural unit wherein n is 1000 to 3000;

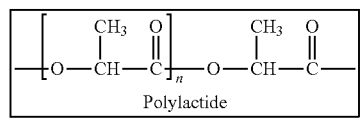

wherein the poly(aliphatic ester)-polycarbonate has (a) a molecular weight of 16,000 to 27,000 g/mole [+/−1000 g/mole] as measured by gel permeation chromatography using bisphenol A polycarbonate standards and 5.0 mole % (of total composition) to 7.0 mole % sebacic acid; or (b) a molecular weight of 30,000 to 42,000 g/mole [+/−1000 g/mole] as measured by gel permeation chromatography using polystyrene standards, and 7.0 mole % to 9.0 mole % sebacic acid, wherein the polylactide content is 2.5 to 25 weight % of (a) and (b), and a molecular weight of 160,000 g/mole to 200,000 g/mole [+/−1000 g/mole] as measured by gel permeation chromatography using polystyrene standards; wherein the composition has an overall biocontent of at least 10% according to ASTM D6866.

The composition may further have at least one poly(aliphatic ester)-polycarbonate of (a) at a molecular weight of 19,000 to 24,000 g/mole [+/−1000 g/mole] as measured by gel permeation chromatography using bisphenol A polycarbonate standards wherein at least one poly(aliphatic ester)-polycarbonate of (b) is at a molecular weight of 33,000 to 39,000 g/mole [+/−1000 g/mole] as measured by gel permeation chromatography using bisphenol A polycarbonate standards. The composition may have a melt volume rate of 28 cm³/10 minutes to 35 cm³/10 minutes according to ISO1133 (5 kg/5 minutes at 240° C.), a melt volume rate of 2.50 cm³/10 minutes to 6.50 cm³/10 minutes according to ISO1133 (5 kg/5 minutes at 240° C.), or a melt volume rate of 7.50 cm³/10 minutes to 12.00 cm³/10 minutes according to ISO1133 (5 kg/5 minutes at 265° C.). The polylactide content of the composition may be 5 to 15 weight % of (a) and (b). The composition may have a melt volume rate of 7.50 cm³/10 minutes to 12.00 cm³/10 minutes according to ISO1133 (5 kg/5 minutes at 265° C.). The composition may have an impact strength of greater than 50 or greater than 60 kJ/m² [+/−5 kJ/m²] at 23° C. according to ISO 180, or greater than 85 kJ/m² [+/−5 kJ/m²] at 10° C. according to ISO 180. The composition may further have an overall biocontent of at least: 15%, 20%, or 30% according to ASTM D6866. The composition may further comprise other additives such as heat stabilizers, mold release agents, glass or colorants. The composition may further comprise an isosorbide containing polymer.

DETAILED DESCRIPTION

Described herein is a high impact blended composition (polymer blend composition or polylactide composition), comprising a combination of one or more polycarbonates, and a polylactide or polylactic acid (PLA) polymer, wherein at least one of the polycarbonates is a sebacic acid derived polyester-polycarbonate copolymer. While not being bound by theory, the inventors have discovered that a sebacic acid derived polyester-polycarbonate copolymer combined with a polylactide polymer imparts desirable impact strength, ductility, and melt volume flow rates for formation of articles molded from the composition. While increasing the overall biocontent of the blend composition over at least 10% according to ASTM D-6866, the composition favorably provides impact strengths over 70 kJ/m² and melt volume rates of 7.50 cm³/10 minutes to 12.00 cm³/10 minutes according to ISO 1133 (5 kg/5 minutes at 265° C.). These high biocontent and high impact strength compositions may be formed into a number of different articles such as computer or business machine housings, housings for hand-held devices, components for light fixtures or home appliances, components for medical applications or devices, or components for interior or exterior components of an automobile. The composition may further comprise other additives such as heat stabilizers, mold release agents, impact modifiers, UV stabilizers, flame retardants, antistatic agents, anti-drip agents, blowing agents, radiation stabilizers and/or colorants.

Definitions

The terminology used herein is for the purpose of describing particular embodiments only and is not intended to be limiting. As used in the specification and the appended claims, the singular forms "a," "and" and "the" include plural references unless the context clearly dictates otherwise.

"Alkyl" as used herein may mean a linear, branched, or cyclic group, such as a methyl group, ethyl group, n-propyl group, isopropyl group, n-butyl group, isobutyl group, tert-butyl group, n-pentyl group, isopentyl group, n-hexyl group, isohexyl group, cyclopentyl group, cyclohexyl group, and the like.

"Alkenyl" as used herein may be a straight or branched hydrocarbonyl chain containing one or more double bonds. Each carbon-carbon double bond may have either cis or trans geometry within the alkenyl moiety, relative to groups substituted on the double bond carbons. Non-limiting examples of alkenyl groups include ethenyl (vinyl), 2-propenyl, 3-propenyl, 1,4-pentadienyl, 1,4-butadienyl, 1-butenyl, 2-butenyl, and 3-butenyl.

"Alkenylene" as used herein may be a divalent unsaturated hydrocarbonyl chain which may be linear or branched and which has at least one carbon-carbon double bond. Non-limiting examples of alkenylene groups include —C(H)=C(H)—, —C(H)=C(H)—CH₂—, —C(H)=C(H)—CH₂—

$-CH_2-$, $-CH_2-C(H)=C(H)-CH_2-$, $-C(H)=C(H)-CH(CH_3)-$, and $-CH_2-C(H)=C(H)-CH(CH_2CH_3)-$.

"Antistatic agent" as used herein may be monomeric, oligomeric, or polymeric materials that can be processed into polymer resins and/or sprayed onto materials or articles to improve conductive properties and overall physical performance. These monomeric, oligomeric, or polymeric materials may also be used as additives.

"Biocontent" as used herein may mean a polymer or composition containing a polymer derived, at least in part, from biologically-based molecular units. The biologically-based unit may be a biologically-derived monomer. The biologically based monomer may be derived from a plant, for example. The plant may be any plant, such as a starch-based plant, castor bean, palm oil, vegetable oil, sugar cane, corn, rice, switch-grass, etc. The biologically-based unit may be isosorbide, sebacic acid, azelaic acid, etc.

"Copolymer" as used herein may mean a polymer derived from two or more structural units or monomeric species, as opposed to a homopolymer, which is derived from only one structural unit or monomer.

"$C_{3-6}$ cycloalkyl" as used herein may mean cyclopropyl, cyclobutyl, cyclopentyl and cyclohexyl.

"Glass Transition Temperature" or "Tg" as used herein may mean the maximum temperature that a polycarbonate will have one or more useful properties. These properties include impact resistance, stiffness, strength, and shape retention. The Tg of a polycarbonate therefore may be an indicator of its useful upper temperature limit, particularly in plastics applications. The Tg may be measured using a differential scanning calorimetric method and expressed in degrees Celsius.

The glass transition temperature of a polycarbonate may depend primarily on the composition of the polycarbonate. Polycarbonates that are formed from monomers having more rigid and less flexible chemical structures than bisphenol A generally have higher glass transition temperatures than bisphenol A, while polycarbonates that are formed from monomers have less rigid and more flexible chemical structures than bisphenol A. For example, polycarbonates generally have lower glass transition temperatures than bisphenol A. For example, a polycarbonate formed from 33 mole % of a rigid monomer, 3,3-bis(4-hydroxyphenyl)-2-phenylisoindolin-1-one ("PPPBP"), and 67 mole % bisphenol A has a glass transition temperature of 198° C., while a polycarbonate formed from bisphenol A, but also having 6 weight % of siloxane units, a flexible monomer, has a glass transition temperature of 145° C.

Mixing of two or more polycarbonates having different glass transition temperatures may result in a glass transition temperature value for the mixture that is intermediate between the glass transition temperatures of the polycarbonates that are mixed.

The glass transition temperature of a polycarbonate may also be an indicator of the molding or extrusion temperatures required to form polycarbonate parts. The higher the glass transition temperature of the polycarbonate, the higher the molding or extrusion temperatures that are needed to form polycarbonate parts.

The glass transition temperatures (Tg) described herein are measures of heat resistance of the corresponding polycarbonate and polycarbonate blends. The Tg can be determined by differential scanning calorimetry. The calorimetric method may use a TA Instruments Q1000 instrument, for example, with a setting of 20° C./min ramp rate and 40° C. start temperature and 200° C. end temperature.

"Halo" as used herein may be a substituent to which the prefix is attached is substituted with one or more independently selected halogen radicals. For example, "$C_{1-6}$ haloalkyl" means a $C_{1-6}$ alkyl substituent wherein one or more hydrogen atoms are replaced with independently selected halogen radicals. Non-limiting examples of $C_{1-6}$ haloalkyl include chloromethyl, 1-bromoethyl, fluoromethyl, difluoromethyl, trifluoromethyl, and 1,1,1-trifluoroethyl. It should be recognized that if a substituent is substituted by more than one halogen radical, those halogen radicals may be identical or different (unless otherwise stated).

"Halogen" or "halogen atom" as used herein may mean a fluorine, chlorine, bromine or iodine atom.

"Heat Deflection temperature" or "Heat Distortion temperature" or "HDT" as used herein may mean the temperature at which a polymer or plastic sample deforms under a specified load. This property of a given plastic material is applied in many aspects of product design, engineering, and manufacture of products using thermoplastic components. Heat Distortion Temperature is determined by the following test procedure outlined in ASTM D648. The test specimen is loaded in three-point bending in the edgewise direction. The outer fiber stress used for testing is either 0.455 MPa or 1.82 MPa, and the temperature is increased at 2° C./min until the specimen deflects 0.25 mm. This is similar to the test procedure defined in the ISO Limitations that are associated with the determination of the HDT in that the sample is not thermally isotropic and, thick samples, in particular, will contain a temperature gradient. The HDT of a particular material can also be very sensitive to stress experienced by the component which is dependent on the component's dimensions. The selected deflection of 0.25 mm (which is 0.2% additional strain) is selected arbitrarily and has no physical meaning.

"Heat of fusion" as used herein may be the change in enthalpy resulting from the addition or removal of heat from 1 mole of a substance to change its state from a solid to a liquid (melting) or the reverse processes of freezing. When thermal energy is withdrawn from a liquid or solid, the temperature falls. When thermal energy is added to a liquid or solid, the temperature rises. However, at the transition point between solid and liquid (the melting point), extra energy is required (the heat of fusion). In going from liquid to solid (freezing), the molecules of a substance become arranged in a more ordered state. For them to attain the order of a solid, slightly less heat is withdrawn at the point of crystallization. The heat not withdrawn is stored in the form of primarily potential energy to build the solid lattice. In going from solid to liquid (melting), the molecules of a substance become arranged in a less ordered state. To create the relative disorder from the solid crystal to liquid, slightly more heat is added at the point of decrystallization. That energy from heat is utilized to break the solid lattice. This heat does not result in a temperature change, and is called a latent (or hidden) heat. The heat of fusion can be observed by measuring the temperature of water as it freezes. If a closed container of room temperature water is plunged into a very cold environment (say −20° C.), the temperature will fall steadily until it drops just below the freezing point (0° C.). The temperature then will rebound and hold steady while the water crystallizes. Once the water is completely frozen, its temperature will fall steadily again. The units of heat of fusion may be expressed as kilojoules per mole (SI units).

"Heteroaryl" as used herein may mean any aromatic heterocyclic ring which may comprise an optionally benzocondensed 5 or 6 membered heterocycle with from 1 to 3 heteroatoms selected among N, O or S. Non limiting examples of heteroaryl groups may include pyridyl, pyrazinyl, pyrimidinyl, pyridazinyl, indolyl, imidazolyl, thiazolyl, isothiazolyl, pyrrolyl, phenyl-pyrrolyl, furyl, phenyl-furyl, oxazolyl, isoxazotyl, pyrazolyl, thienyl, benzothienyl, isoindolinyl, benzoimidazolyl, isoquinolinyl, quinolinyl, 1,2,3-triazolyl, 1-phenyl-1,2,3-triazolyl, and the like.

"Hindered phenol stabilizer" as used herein may mean 3,5-di-tert-butyl-4-hydroxyhydrocinnamic acid, octadecyl ester.

"(Meth)acrylic acid" includes both acrylic and methacrylic acid monomers.

"(Meth)acrylate" includes both acrylate and methacrylate monomers.

"Melt Volume Rate" (MVR) as used herein may measure the rate of extrusion of a thermoplastic through an orifice at a prescribed temperature and load. The MVR measurement is a flow rate of a polymer in a melt phase as determined using the method of ISO 1133. The MVR of a molten polymer is measured by determining the amount of polymer that flows through a capillary of a specific temperature over a specified time using standard weights at a fixed temperature. MVR is a displacement measurement method, based on the measure of the piston displacement by means of an encoder. MVR is measured by packing a small amount of polymer material into an extruder barrel of an extruder. The polymer material is preheated for a specified amount of time at a particular temperature. For example, MVR measurements are done where the polymer material has been heated at 240° C. or 265° C. for 300 seconds (5 minutes). After preheating the polymer sample to be measured, a particular weight is introduced to a piston, which acts as the medium that causes extrusion of the molten polymer. Typical weights introduced to the pistons may be at 5 kg. The weight exerts a force on the piston and thereby the molten polymer and the molten polymer flows through the dye wherein the displacement of the molten polymer is measured in cubic centimeters per over time such as 10 minutes (cm$^3$/10 min). Accordingly, MVR is measured in cm$^3$/10 minutes according to ISO 1133.

"Onset degradation temperature" as used herein may mean thermal degradation of polymers as a result of high temperatures or overheating. At high temperatures, the components of the long chain backbone of the polymer can begin to separate (molecular scission) and react with one another to change the properties of the polymer. Thermal degradation can present an upper limit to the service temperature of plastics as much as the possibility of mechanical property loss. Indeed, unless correctly prevented, significant thermal degradation can occur at temperatures much lower than those at which mechanical failure is likely to occur. The chemical reactions involved in thermal degradation lead to physical and optical property changes relative to the initially specified properties. Thermal degradation generally involves changes to the molecular weight (and molecular weight distribution) of the polymer and typical property changes include reduced ductility and embrittlement, chalking, color changes, cracking, and a general reduction in most other desirable physical properties. Thermal degradation may occur through random chain scission, side-group elimination, or oxidation of the polymer.

"PETS release agent" as used herein may mean pentaerythritol tetrastearate, mold release.

"Phosphite stabilizer" as used herein may mean tris-(2,4-di-tert-butylphenyl)phosphite.

"Polycarbonate" as used herein may mean an oligomer or polymer comprising residues of one or more polymer structural units, or monomers, joined by carbonate linkages.

"Straight or branched $C_{1-3}$ alkyl" or "straight or branched $C_{1-3}$ alkoxy" as used herein may mean methyl, ethyl, n-propyl, isopropyl, methoxy, ethoxy, n-propoxy and isopropoxy.

"Substituted" as used herein may mean that at least one hydrogen on the designated atom or group is replaced with another group provided that the designated atom's normal valence is not exceeded. For example, when the substituent is oxo (i.e., =O), then two hydrogens on the atom are replaced. Combinations of substituents and/or variables are permissible provided that the substitutions do not significantly adversely affect synthesis or use of the compound.

Unless otherwise indicated, each of the foregoing groups may be unsubstituted or substituted, provided that the substitution does not significantly adversely affect synthesis, stability, or use of the compound.

The terms "structural unit" and "monomer" are interchangeable as used herein.

For the recitation of numeric ranges herein, each intervening number there between with the same degree of precision is explicitly contemplated. For example, for the range of 6-9, the numbers 7 and 8 are contemplated in addition to 6 and 9, and for the range 6.0-7.0, the numbers 6.0, 6.1, 6.2, 6.3, 6.4, 6.5, 6.6, 6.7, 6.8, 6.9, and 7.0 are explicitly contemplated.

High Impact Blended Composition

The present invention is directed to a high impact strength (e.g., greater than or equal to 50 kJ/m$^2$, more specifically, greater than or equal to 60 kJ/m$^2$, and still more specifically, greater than or equal to 80 kJ/m$^2$ according to ISO 180) blended composition comprising a combination of one or more polycarbonates, and a polylactide or polylactic acid (PLA) polymer. At least one polycarbonate of the composition is derived from a soft block ester unit of the formula

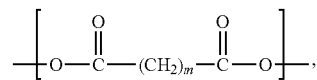

wherein m is 4 to 40. This polyester-polycarbonate copolymer may have at least one unit derived from sebacic acid. The sebacic acid containing polyester-polycarbonate may provide an interface that interacts with PLA favorably to provide stability, and an increase in ductility and impact strength over standard polycarbonate/polylactide polymer blends. The melt volume rate of the composition is similar to standard polycarbonate (e.g., ≥8 cm$^3$/10 minutes according to ISO 1133 (5 kg/5 minutes at 265° C.). Although the blended composition does not require an impact modifier unlike previous polylactide polycarbonate blends, the blended composition may further comprise impact modifiers to improve the impact performance, such as an epoxy impact modifier to provide an increase in ductility and impact strength. Though, impact modifiers with previous polylactide polycarbonate blends have created issues regarding transparency, aesthetics, flow, and flame performance.

In general, the addition of PLA in most polycarbonate blends creates articles derived from the blends that become brittle according to the notched Izod test using ASTM D 256-10. Adding PLA with a polycarbonate with at least one unit being derived from a sebacic acid derived polyester-polycarbonate overcomes the brittleness issue. The blended composition may possess greater than or equal to: 60%, 65%, 70%, 75%, 80%, 85%, 90%, or 95% ductility in a notched Izod test at: −20° C., −15° C., −10° C., 0° C., 5° C., 10° C., 15° C., 20° C., 23° C., 25° C., 30° C., or 35° C. at a thickness of 0.125 inches according to ASTM D 256-10. The blended composition may possess 100% ductility in a notched Izod test at: −20° C., −15° C., −10° C., 0° C., 5° C., 10° C., 15° C., 20° C., 23° C., 25° C., 30° C., or 35° C. at a thickness of 0.125 inches according to ASTM D 256-10. Notched Izod measurements, in accordance with ASTM D 256-10, may be conducted on test bars that measure 0.125 inches thick by 0.5 inches wide and 2.5 inches long at room temperature (23° C.) and lower temperatures as indicated in the tables provided in the examples below. The blended composition may possess an 80% or greater ductility in a notched Izod test at 0° C. at a thickness of 0.125 inches according to ASTM D 256-10. For example, if the blended composition exhibits 100% ductility, then if 5 samples are tested in a notched Izod protocol, all 5 samples exhibit ductile breaks. A sample may mean a blended composition test bar. The test bar may have a defined thickness. The blended composition test bar has undergone ductile failure in a notched Izod test if, after impact, the bar remains as a single piece, with the two ends of the bar attached and rigid (i.e. self supporting). A test bar has undergone brittle failure if after impact either of the two ends of the bar has broken into two separate pieces or if they are attached by only a thin, flexible connection of plastic.

The blended composition may comprise greater than: 1, 5, 10, 15, 20, 25, 30, 35, 40, 45, 50, 55, or 60 weight % of PLA in combination with at least one polycarbonate unit being a sebacic acid derived polyester-polycarbonate, and still maintain ductility (100%) at 10° C. and 23° C. according to ISO 180. In comparison, the addition of more than 5% of PLA to other polycarbonate (PC)-copolymers creates blend compositions that are brittle. At 0° C., up to 10% PLA in the blended composition maintains it ductility (100%).

The blended composition may have an impact strength average of greater than or equal to: 45 $kJ/m^2$, 50 $kJ/m^2$, 55 $kJ/m^2$, 60 $kJ/m^2$, 65 $kJ/m^2$, 70 $kJ/m^2$, 75 $kJ/m^2$, 80 $kJ/m^2$, 85 $kJ/m^2$, or 90 $kJ/m^2$ at 23° C. according to ISO 180 and an article having a thickness of 3 mm. The blended composition may have an impact strength average of greater than or equal to: 50 $kJ/m^2$ or greater than or equal to 60 $kJ/m^2$ according to ISO 180 and an article having a thickness of 3 mm. The blended composition may have an impact strength average of greater than or equal to: 60 $kJ/m^2$, 65 $kJ/m^2$, 70 $kJ/m^2$, 75 $kJ/m^2$, 80 $kJ/m^2$, 85 $kJ/m^2$, 90 $kJ/m^2$, 100 $kJ/m^2$, or 110 $kJ/m^2$ at 10° C. according to ISO 180 and an article having a thickness of 3 mm. The blended composition may have an impact strength average of greater than or equal to: 60 $kJ/m^2$, 65 $kJ/m^2$, 70 $kJ/m^2$, 75 $kJ/m^2$, 80 $kJ/m^2$, 85 $kJ/m^2$, 90 $kJ/m^2$, 100 $kJ/m^2$, or 110 $kJ/m^2$ at 0° C. according to ISO 180 and an article having a thickness of 3 mm. The blended composition may have an impact strength of greater than or equal to 70 $kJ/m^2$ according to ISO 180 and an article having a thickness of 3 mm. The error rate of measuring the impact strength may be $^{+/-}5$ $kJ/m^2$.

The blended composition may have a melt volume rate (MVR) of: 1 to 40 $cm^3/10$ minutes, 2 to 39 $cm^3/10$ minutes, 3 to 38 $cm^3/10$ minutes, 4 to 37 $cm^3/10$ minutes, 5 to 36 $cm^3/10$ minutes, 6 to 35 $cm^3/10$ minutes, 7 to 34 $cm^3/10$ minutes, 8 to 33 $cm^3/10$ minutes, 9 to 32 $cm^3/10$ minutes, 10 to 31 $cm^3/10$ minutes, 11 to 30 $cm^3/10$ minutes, 12 to 29 $cm^3/10$ minutes, 13 to 28 $cm^3/10$ minutes, 14 to 27 $cm^3/10$ minutes, 15 to 26 $cm^3/10$ minutes, 16 to 25 $cm^3/10$ minutes, 15 to 24 $cm^3/10$ minutes, 16 to 23 $cm^3/10$ minutes, 17 to 22 $cm^3/10$ minutes, 18 to 21 $cm^3/10$ minutes, 1.5 to 6.5 $cm^3/10$ minutes, 2.0 to 6.0 $cm^3/10$ minutes, 2.5 to 5.5 $cm^3/10$ minutes, 3.0 to 5.0 $cm^3/10$ minutes, or 3.5 to 4.5 $cm^3/10$ minutes according to ISO 1133 (5 kg/5 minutes at 240° C.). The blended composition may have a melt volume rate (MVR) of: 2 to 8 $cm^3/10$ minutes, 2.25 to 7.50 $cm^3/10$ minutes, 2.50 to 6.50 $cm^3/10$ minutes, 3.0 to 6.0 $cm^3/10$ minutes, 3.5 to 5.5 $cm^3/10$ minutes, or 4.0 to 5.0 $cm^3/10$ minutes according to ISO 1133 (5 kg/5 minutes at 240° C.).

The blended composition may have a MVR of: 6.0 to 20.0 $cm^3/10$ minutes, 6.5 to 19.5 $cm^3/10$ minutes, 7.0 to 19.0 $cm^3/10$ minutes, 7.5 to 18.5 $cm^3/10$ minutes, 8.0 to 18.0 $cm^3/10$ minutes, 8.5 to 17.5 $cm^3/10$ minutes, 9.0 to 17.0 $cm^3/10$ minutes, 9.5 to 16.5 $cm^3/10$ minutes, 10.0 to 16.0 $cm^3/10$ minutes, 10.5 to 15.5 $cm^3/10$ minutes, 11 to 15 $cm^3/10$ minutes, 11.5 to 14.5 $cm^3/10$ minutes, 12.0 to 14.0 $cm^3/10$ minutes, 12.5 to 13.5 $cm^3/10$ minutes, 2.8 to 3.5 $cm^3/10$ minutes, 3.5 to 6.0 $cm^3/10$ minutes, 6.5 to 10 $cm^3/10$ minutes, 7.50 to 12.0 $cm^3/10$ minutes, or 8 to 10 $cm^3/10$ minutes according to ISO 1133 (5 kg/5 minutes at 265° C.). The blended composition may have a MVR of: 70.0 to 100 $cm^3/10$ minutes, 70.5 to 99.5 $cm^3/10$ minutes, 71.0 to 99.0 $cm^3/10$ minutes, 71.5 to 98.5 $cm^3/10$ minutes, 72.0 to 98.0 $cm^3/10$ minutes, 72.5 to 97.5 $cm^3/10$ minutes, 73.0 to 97.0 $cm^3/10$ minutes, 73.5 to 96.5 $cm^3/10$ minutes, 74.0 to 96.0 $cm^3/10$ minutes, 74.5 to 95.5 $cm^3/10$ minutes, 75 to 95 $cm^3/10$ minutes, 75.5 to 94.5 $cm^3/10$ minutes, 76.0 to 94.0 $cm^3/10$ minutes, 76.5 to 93.5 $cm^3/10$ minutes, 77 to 93 $cm^3/10$ minutes, 75.5 to 92.5 $cm^3/10$ minutes, 76 to 92 $cm^3/10$ minutes, 76.5 to 91.5 $cm^3/10$ minutes, 77 to 91 $cm^3/10$ minutes, 77.5 to 90.5 $cm^3/10$ minutes, 78 to 90 $cm^3/10$ minutes, 78.5 to 89.5 $cm^3/10$ minutes, 79 to 89 $cm^3/10$ minutes, 79.5 to 88.5 $cm^3/10$ minutes, 80 to 88 $cm^3/10$ minutes, 80.5 to 87.5 $cm^3/10$ minutes, 81 to 87 $cm^3/10$ minutes, 81.5 to 86.5 $cm^3/10$ minutes, 82 to 86 $cm^3/10$ minutes, 82.5 to 85.5 $cm^3/10$ minutes, or 83 to 85 $cm^3/10$ minutes according to ISO 1133 (5 kg/5 minutes at 265° C.).

The blended composition may have a glass transition temperature (Tg) of: between 130° C. and 147° C., between 132° C. and 145° C., between 133° C. and 142° C., between 134° C. and 139° C., or between 135° C. and 137° C. as measured using differential scanning calorimetry. The blended composition may have a glass transition temperature of 135° C.

The blended composition may have a biocontent according to ASTM-D6866 of at least: 2 weight %, 3 weight %, 4 weight %, 5 weight %, 6 weight %, 7 weight %, 8 weight %, 9 weight %, 10 weight %, 11 weight %, 12 weight %, 13 weight %, 14 weight %, 15 weight %, 16 weight %, 17 weight %, 18 weight %, 19 weight %, 20 weight %, 25 weight %, 30 weight %, 35 weight %, 40 weight %, 45 weight %, 50 weight %, 55 weight %, 60 weight %, or 65 weight %. The blended composition may have at least: 3.0 weight %, 4.0 weight %, 5.0 weight %, 6.0 weight %, 7.0 weight %, 8.0 weight %, 9.0 weight %, or 10.0 weight % of sebacic acid content according to ASTM-D6866.

Polylactic Acid (PLA)

The blended composition comprises a polylactide or polylactic acid (either referred to as "PLA") polymer. PLA is a biodegradable, thermoplastic, aliphatic polyester derived from renewable resources such as corn, tapioca products, or sugarcane. It is commercially available from NatureWorks LLC, Minnetoka, Minn. and Purac, Frankfurt, Germany. PLA is a biopolymer that generates low amounts of greenhouse gases during production. PLA production is due to bacterial fermentation producing lactic acid, which is oligomerized and catalytically dimerized to make the monomer for ring-opening polymerization. PLA may be easily produced in high molecular weight form through ring-opening polymerization using a stannous octoate catalyst or other catalysts such as tin (II) chloride. Overall, PLA production and consumption provides a lower total energy consumption than other non-biocontent polymers.

The PLA polymer may be a melt processed polymer based on D and/or L isomeric lactic acid. The isomers may be used singularly or in combination to form a PLA polymer. The PLA polymer may include an L-isomeric lactic acid, a D-isomeric lactic acid, or an L,D-isomeric lactic acid. The PLA may be a mixture of standard PLA and those with D-lactide monomers that form a stereocomplex PLA as discussed below. PLA may be a blend of poly-L-lactide (PLLA) and poly-D-lactide (PDLA) at particular rations. Standard PLA has a higher content of PLLA (around 70-80%). PLA may be stereocomplex PLA, which is a 50/50 blend of PLLA and PDLA. The PLA may have the following structural unit

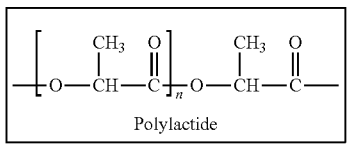
Polylactide wherein n is between: 400 and 4000, 500 and 4500, 600 and 4400, 700 and 4300, 800 and 4200, 900 and 4100, 1000 and 4000, 1000 and 3900, 1000 and 3800, 1000 and 3700, 1000 and 3600, 1000 and 3500, 1000 and 3400, 1000 and 3300, 1000 and 3200, 1000 and 3100, 1000 and 3000, 1000 and 2900, 1000 and 2800, 1000 and 2700, 1000 and 2600, 1000 and 2500, 1100 and 2400, 1200 and 2300, 1300 and 2200, 1400 and 2100, 1500 and 2000, 1600 and 1900, or 1700 and 1800.

The PLA may not have any particular limitation on the molecular weight or molecular weight distribution in the composition as long as the composition can be molded. The PLA may have an overall average molecular weight of between: 100,000 to 300,000 g/mole, 110,000 to 290,000 g/mole, 120,000 to 280,000 g/mole, 130,000 to 270,000, 140,000 to 260,000, 150,000 to 250,000, 160,000 to 240,000, 170,000 to 230,000, 180,000 to 220,000, 190,000 to 210,000, 190,000 to 205,000, or 195,000 to 205,000 g/mole as measured by gel permeation chromatography using polystyrene standards. The PLA may have an overall average molecular weight of between: 100,000 to 300,000, 150,000 to 250,000, 175,000 to 225,000, or 160,000 to 200,000 g/mole as measured by gel permeation chromatography using polystyrene standards. The PLA may have an overall average molecular weight of between 160,000 to 200,000 g/mole as measured by gel permeation chromatography using polystyrene standards. The PLA may have an overall average molecular weight of less than or equal to: 300,000 g/mole, 275,000 g/mole, 250,000 g/mole, 245,000 g/mole, 240,000 g/mole, 235,000 g/mole, 230,000 g/mole, 225,000 g/mole, 220,000 g/mole, 215,000 g/mole, 210,000 g/mole, 205,000 g/mole, 200,000 g/mole, 195,000 g/mole, 190,000 g/mole, 185,000 g/mole, 180,000 g/mole, 175,000 g/mole, 170,000 g/mole, 160,000 g/mole, 145,000 g/mole, 130,000 g/mole, 125,000 g/mole 120,000 g/mole, 115,000 g/mole, 110,000 g/mole, 105,000 g/mole, or 100,000 g/mole as measured by gel permeation chromatography using polystyrene standards. The PLA may have a weight average molecular weight of greater than or equal to: 150,000 g/mole, 160,000 g/mole, 170,000 g/mole, 180,000 g/mole, 190,000 g/mole, 200,000 g/mole, 205,000 g/mole, 210,000 g/mole, 215,000 g/mole, 220,000 g/mole, 225,000 g/mole, 230,000 g/mole, 235,000 g/mole, 240,000 g/mole, 245,000 g/mole, 250,000 g/mole, 260,000 g/mole, 265,000 g/mole, 270,000 g/mole, or 275,000 g/mole in order to provide a molded product with balanced mechanical strength and heat resistance. The PLA may have an average molecular weight of between 160,000 and 200,000 g/mole as measured by gel permeation chromatography using polystyrene. The error rate of the molecular weight of PLA may be $^{+/-}1000$ g/mole.

Overall, the PLA weight % content of the composition may be between: 2 and 30 weight percent %, 3 and 28 weight %, 4 and 27 weight %, 5 and 25 weight %, 6 and 23 weight %, 7 and 20 weight %, 8 and 18 weight %, 9 and 16 weight %, 10 and 15 weight %, or 11 and 13 weight %. The PLA weight % content of the composition may be greater than or equal to: 2.0 weight %, 2.5 weight %, 3.0 weight %, 3.5 weight %, 4.0 weight %, 4.5 weight %, 5 weight %, 6 weight %, 7 weight %, 8 weight %, 9 weight %, 10 weight %, 11 weight %, 12 weight %, 13 weight %, 14 weight %, 15 weight %, 16 weight %, 17 weight %, 18 weight %, 19 weight %, 20 weight %, 21 weight %, 22 weight %, 23 weight % 24 weight %, or 25 weight %. The PLA content may be between 2.5% and 15%, or 5% and 25% of the total composition. The PLA may be between 5 to 25% weight of the total composition.

The onset degradation temperature of PLA may be: 325° C., 326° C., 327° C., 328° C., 329° C., 330° C., 331° C., 332° C., 332.1° C., 332.2° C., 332.3° C., 332.4° C., 332.5° C., 332.6° C., 332.7° C., 332.8° C., 332.9° C., 333.0° C., 334° C., 335° C., 336° C., 337° C., 338° C., 339° C., or 340° C. as measured in air. The onset degradation temperature of PLA may be: 332.8° C. as measured in air. The onset degradation temperature of PLA may be: 325° C., 326° C., 327° C., 328° C., 329° C., 330° C., 331° C., 332° C., 333° C., 333.1° C., 333.2° C., 333.3° C., 333.4° C., 333.5° C., 333.6° C., 333.7° C., 333.8° C., 333.9° C., 334° C., 335° C., 336° C., 337° C., 338° C., 339° C., or 340° C. as measured in nitrogen. The onset degradation temperature of PLA may be 333.4° C. as measured in nitrogen.

The heat of fusion temperature for PLA may be: −16.0° C., −16.5° C., −17.0° C., −18.0° C., −18.1° C., −18.2° C., −18.3° C., −18.4° C., −18.5° C., −18.6° C., −18.7° C., −18.8° C., −18.9° C., −19.0° C., −19.5° C., or −20.0° C. The heat of fusion temperature for PLA may be −18.3° C.

The overall melt flow rate of the PLA may be between: 1 to 200, 2 to 50, or 3 to about 20 g/10 minutes as determined according to ASTM D123-E (210° C./2.16 kg). The PLA may have a melting point (Tm) of: 150° C., 151° C., 152° C., 153° C., 154° C., 155° C., 156° C., 157° C., 158° C., 159° C., 160° C., 161° C., 162° C., 163° C., 164° C., 165° C., 166° C., 167° C., 168° C., 169° C., 170° C., 171° C., 172° C., 173° C., 174° C., 175° C., 176° C., 177° C., or 178° C. The PLA may have a melting point of 165° C. The PLA may have a glass transition temperature around: 50° C., 51° C., 52° C., 53° C., 54° C., 55° C., 56° C., 57° C., 58° C., 59° C., 60° C., 61° C., 62° C., 63° C., 64° C., 65° C., 66° C., 67° C., 68° C., 69° C., or 70° C. The PLA may have a glass transition temperature of 60° C. The PLA may have a melting point of 178° C.

Poly-L-Lactide (PLLA)

An L-isomeric lactic acid may lead to synthesis of a poly-L-lactide (PLLA). The poly-L-lactide (PLLA) is a product from the polymerization of L,L-lactide and is a homopolymer. The PLLA may have a molecular weight of less than or equal to 1,000,000. PLLA has a crystalline percentage around 37%, a glass transition temperature between 50-80° C. and a melting temperature between 173-178° C. The PLLA may be combined with poly-D-lactide (PDLA) to make poly-DL-lactide (PDLLA). PLLA may have an average molecular weight of: 100,000 to 180,000 g/mole, 110,000 to 170,000 g/mole, 120,000 to 160,000 g/mole, 130,000 to 150,000 g/mole, or 135,000 to 145,000 g/mole as measured by gel permeation chromatography using polystyrene standards. PLLA may have an average molecular weight of: 140,000 to 220,000 g/mole, 150,000 to 200,000 g/mole, 160,000 to 180,000 g/mole, or 160,000 to 170,000 g/mole as measured by gel permeation chromatography using polystyrene standards.

Poly-D-Lactide (PDLA)

The D-isomeric lactic acid or lactide may lead to the synthesis of poly-D-lactide (PDLA). Poly-D-lactide (PDLA) is a nucleating agent that increases the crystallization rate of overall PLA copolymer blends. The poly-D-lactide may be a monomer developed and is commercially available by Purac, Frankfurt, Germany. The D-lactide monomer can be polymerized into a PDLA homopolymer, with L-lactide to make PDLLA (discussed below), or the PLA (which is a mixture of PLLA and PDLA) to make a stereocomplex PLA. PDLA may have an average molecular weight of: 140,000 to 240,000 g/mole, 150,000 to 230,000 g/mole, 160,000 to 220,000 g/mole, 170,000 to 210,000 g/mole, 180,000 to 200,000 g/mole, or 185,000 to 195,000 g/mole as measured by gel permeation chromatography using polystyrene standards. PDLA may have an average molecular weight of: 140,000 to 220,000 g/mole, 150,000 to 210,000 g/mole, 160,000 to 200,000 g/mole, or 160,000 to 170,000 g/mole as measured by gel permeation chromatography using polystyrene standards.

Poly-DL-Lactide (PDLLA)

A racemic mixture of L- and D-isomeric lactic acids or lactides may lead to synthesis of poly-DL-lactide (PDLLA). PDLLA is not crystalline, but rather amorphous. The PDLLA may have an overall average molecular weight of between: 100,000 to 300,000 g/mole, 110,000 to 290,000 g/mole, 120,000 to 280,000 g/mole, 130,000 to 270,000 g/mole, 140,000 to 260,000 g/mole, 150,000 to 250,000 g/mole, 160,000 to 240,000 g/mole, 170,000 to 230,000 g/mole, 180,000 to 220,000 g/mole, 190,000 to 210,000 g/mole, 190,000 to 205,000 g/mole, or 195,000 to 205,000 g/mole as measured by gel permeation chromatography using polystyrene standards. The PDLLA may have an overall average molecular weight of between: 100,000 to 300,000 g/mole, 150,000 to 250,000 g/mole, or 175,000 to 225,000 g/mole as measured by gel permeation chromatography using polystyrene standards. The PDLLA may have an overall average molecular weight of between 160,000 to 200,000 g/mole as measured by gel permeation chromatography using polystyrene standards.

PLA Copolymers of D- and L-Lactic Units

PLA may be a blend of PLLA and PDLA at particular ratios. Standard PLA has a higher content of PLLA (around 70-80%). PLA may be stereocomplex PLA, which is a 50/50 blend of PLLA and PDLA. PLA may be processed like most thermoplastics into fiber and file using methods such as the melt spinning process. By blending poly-D-lactide (PDLA) with poly-L-lactide (PLLA), the melting temperature can be increased to 40-50° C., and the Heat Deflection temperature of PLLA can be increased from approximately 60° C. to up to 190° C. D-lactide as discussed above may be combined with standard commercial PLA, with mostly PLLA with small amounts of PDLA impurities to make the stereocomplex PLA (50-50 blend). This PLA 50/50 blend has a melt temperature range of 220 to 230° C. or 148 to 160° C. of standard PLA. The Heat Deflection temperature (HDT) according to ASTM D648 of the PLA 50/50 blend may be 160 to 167° C. as compared to 100 to 148° C. for highly crystalline PLLA and 54 to 60° C. for standard PLA. Maximum effects are observed in temperature stability when this 50-50 blend is used, but lower concentrations of PDLA (e.g., a reduction 3-10%) may be used.

Polycarbonate

The blended composition comprises a combination of one or more polycarbonates. "Polycarbonates" and "polycarbonate resins" may include homopolycarbonates, copolymers comprising different moieties in the carbonate (referred to as "copolycarbonates"), copolymers comprising carbonate units and other types of polymer units such as polyester units, polysiloxane units, and combinations comprising at least one homopolycarbonate and copolycarbonate.

Homopolycarbonate/Copolycarbonate

The polycarbonate may be a homopolycarbonate or a copolycarbonate. The term "polycarbonate" and "polycarbonate resin" mean compositions having repeating structural carbonate units of the formula (1):

wherein at least about 60 percent of the total number of $R^1$ groups may contain aromatic organic groups and the balance thereof are aliphatic or alicyclic, or aromatic groups. $R^1$ in the carbonate units of formula (1) may be a $C_{6-36}$ aromatic group wherein at least one moiety is aromatic. Each $R^1$ may be an aromatic organic group, for example, a group of the formula (2):

$$-A^1-Y^1-A^2- \tag{2}$$

wherein each of the $A^1$ and $A^2$ is a monocyclic divalent aryl group and $Y^1$ is a bridging group having one or two atoms that separate $A^1$ and $A^2$. For example, one atom may separate $A^1$ from $A^2$, with illustrative examples of these groups including —O—, —S—, —S(O)—, —S(O)$_2$—, —C(O)—, methylene, cyclohexyl-methylene, 2-[2.2.1]-bicycloheptylidene, ethylidene, isopropylidene, neopentylidene, cyclohexylidene, cyclopentadecylidene, cyclododecylidene, and adamantylidene. The bridging group of $Y^1$ may be a hydrocarbon group or a saturated hydrocarbon group such as methylene, cyclohexylidene, or isopropylidene.

The polycarbonates may be produced from dihydroxy compounds having the formula HO—$R^1$—OH, wherein $R^1$ is defined as above for formula (1). The formula HO—$R^1$—OH includes bisphenol compounds of the formula (3):

$$\text{HO-}A^1\text{-}Y^1\text{-}A^2\text{-OH} \tag{3}$$

wherein $Y^1$, $A^1$, and $A^2$ are as described above. For example, one atom may separate $A^1$ and $A^2$. Each $R^1$ may be derived from bisphenol compounds of the general formula (4):

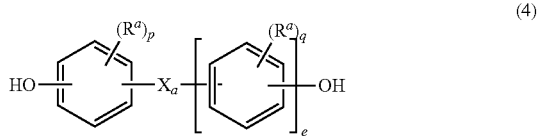

$X_a$ may be a bridging group connecting the two hydroxy-substituted aromatic groups, where the bridging group and the hydroxy substituent of each $C_6$ arylene group are disposed ortho, meta, or para (specifically para) to each other on the $C_6$ arylene group. For example, the bridging group $X_a$ may be single bond, —O—, —S—, —C(O)—, or a $C_{1-25}$ organic group. The $C_{1-25}$ organic bridging group may be cyclic or acyclic, aromatic or non-aromatic, and can further comprise heteroatoms such as halogens, oxygen, nitrogen, sulfur, silicon, or phosphorous. The $C_{1-25}$ organic group can be disposed such that the $C_6$ arylene groups connected thereto are each connected to a common alkylidene carbon or to different carbons of the $C_{1-25}$ organic bridging group. $R^a$ and $R^b$ may each represent a halogen, $C_{1-12}$ alkyl group or combination thereof. For example, $R^a$ and $R^b$ may each be a $C_{1-3}$ alkyl group, specifically methyl, disposed meta to the hydroxy group on each arylene group. Each e is 0 or 1. The letters p and q are each independently integers of 0 to 4. It will be understood that $R^a$ is hydrogen when p is 0, and likewise $R^b$ is hydrogen when q is 0.

$X_a$ may be substituted or unsubstituted $C_{3-18}$ cycloalkylidene, a $C_{1-25}$ alkylidene of formula —$C(R^c)(R^d)$— wherein $R^c$ and $R^d$ are each independently hydrogen, $C_{1-12}$ alkyl, $C_{1-12}$ cycloalkyl, $C_{7-12}$ arylalkyl, $C_{1-12}$ heteroalkyl, or cyclic $C_{7-12}$ heteroarylalkyl, or a group of the formula —$C(=R^e)$— wherein $R^e$ is a divalent $C_{1-12}$ hydrocarbon group. This may include methylene, cyclohexylmethylene, ethylidene, neopentylidene, and isopropylidene, as well as 2-[2.2.1]-bicycloheptylidene, cyclohexylidene, cyclopentylidene, cyclododecylidene, and adamantylidene. A specific example wherein $X_a$ is a substituted cycloalkylidene is the cyclohexylidene-bridged, alkyl-substituted bisphenol of formula (5):

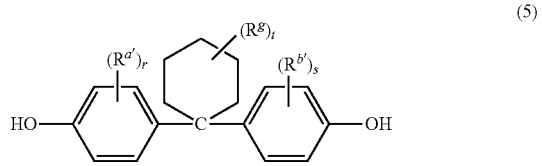

(5)

wherein $R^{a'}$ and $R^{b'}$ are each independently $C_{1-12}$ alkyl, $R^g$ is $C_{1-12}$ alkyl or halogen, r and s are each independently 1 to 4, and t is 0 to 10. $R^{a'}$ and $R^{b'}$ may be disposed meta to the cyclohexylidene bridging group. The substituents $R^{a'}$, $R^{b'}$ and $R^g$ may, when comprising an appropriate number of carbon atoms, be straight chain, cyclic, bicyclic, branched, saturated, or unsaturated. For example, $R^{a'}$, $R^{b'}$ and $R^g$ may be each independently $C_{1-4}$ alkyl, r and s are each 1, and t is 0 to 5. In another example, $R^{a'}$, $R^{b'}$ and $R^g$ may each be methyl, r and s are each 1, and t is 0 or 3. The cyclohexylidene-bridged bisphenol can be the reaction product of two moles of o-cresol with one mole of cyclohexanone. In another example, the cyclohexylidene-bridged bisphenol may be the reaction product of two moles of a cresol with one mole of a hydrogenated isophorone (e.g., 1,1,3-trimethyl-3-cyclohexane-5-one). Such cyclohexane-containing bisphenols, for example the reaction product of two moles of a phenol with one mole of a hydrogenated isophorone, are useful for making polycarbonate polymers with high glass transition temperatures and high heat distortion temperatures. Cyclohexyl bisphenol-containing polycarbonates, or a combination comprising at least one of the foregoing with other bisphenol polycarbonates, are supplied by Bayer Co. under the APEC* trade name.

$X_a$ may be a $C_{1-18}$ alkylene group, a $C_{3-18}$ cycloalkylene group, a fused $C_{6-18}$ cycloalkylene group, or a group of the formula —$B_1$—$W$—$B_2$— wherein $B_1$ and $B_2$ are the same or different $C_{1-6}$ alkylene group and W is a $C_{3-12}$ cycloalkylidene group or a $C_{6-16}$ arylene group.

In another example, $X_a$ may be a substituted $C_{3-18}$ cycloalkylidene of the formula (6):

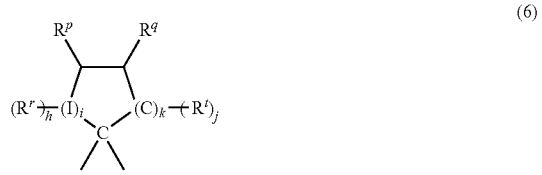

(6)

wherein $R^r$, $R^p$, $R^q$ and $R^t$ are independently hydrogen, halogen, oxygen, or $C_{1-12}$ organic groups; I is a direct bond, a carbon, or a divalent oxygen, sulfur, or —$N(Z_1)$— where $Z_1$ is hydrogen, halogen, hydroxy, $C_{1-12}$ alkyl, $C_{1-12}$ alkoxy, $C_{6-12}$ aryl, or $C_{1-12}$ acyl; h is 0 to 2, j is 1 or 2, i is an integer of 0 or 1, and k is an integer of 0 to 3, with the proviso that at least two of $R^r$, $R^p$, $R^q$ and $R^t$ taken together are a fused cycloaliphatic, aromatic, or heteroaromatic ring. It will be understood that where the fused ring is aromatic, the ring as shown in formula (6) will have an unsaturated carbon-carbon linkage where the ring is fused. When i is 0, h is 0, and k is 1, the ring as shown in formula (6) contains 4 carbon atoms; when i is 0, h is 0, and k is 2, the ring as shown contains 5 carbon atoms, and when i is 0, h is 0, and k is 3, the ring contains 6 carbon atoms. In one example, two adjacent groups (e.g., $R^q$ and $R^t$ taken together) form an aromatic group, and in another embodiment, $R^q$ and $R^t$ taken together form one aromatic group and $R^r$ and $R^p$ taken together form a second aromatic group. When $R^q$ and $R^t$ taken together form an aromatic group, $R^p$ can be a double-bonded oxygen atom, i.e., a ketone.

Other useful dihydroxy compounds having the formula HO—$R^1$—OH include aromatic dihydroxy compounds of formula (7):

(7)

wherein each $R^h$ is independently a halogen atom, a $C_{1-10}$ hydrocarbyl such as a $C_{1-10}$ alkyl group, a halogen substituted $C_{1-10}$ hydrocarbyl such as a halogen-substituted $C_{1-10}$ alkyl group, and p is 0 to 4. When $R^h$ is halogen, it is usually bromine.

Bisphenol-type dihydroxy aromatic compounds may include the following: 4,4'-dihydroxybiphenyl, 1,6-dihydroxynaphthalene, 2,6-dihydroxynaphthalene, bis(4-hydroxyphenyl)methane, bis(4-hydroxyphenyl)diphenylmethane, bis(4-hydroxyphenyl)-1-naphthylmethane, 1,2-bis(4-hydroxyphenyl)ethane, 1,1-bis(4-hydroxyphenyl)-1-phenylethane, 2-(4-hydroxyphenyl)-2-(3-hydroxyphenyl)propane, bis(4-hydroxyphenyl)phenylmethane, 2,2-bis(4-hydroxy-3-bromophenyl)propane, 1,1-bis(hydroxyphenyl)cyclopentane, 1,1-bis(4-hydroxyphenyl)cyclohexane, 1,1-bis(4-hydroxy-3-methylphenyl)cyclohexane, 1,1-bis(4-hydroxyphenyl)isobutene, 1,1-bis(4-hydroxyphenyl)cyclododecane, trans-2,3-bis(4-hydroxyphenyl)-2-butene, 2,2-bis(4-hydroxyphenyl)adamantane, (alpha,alpha'-bis(4-hydroxyphenyl)toluene, bis(4-hydroxyphenyl)acetonitrile, 2,2-bis(3-methyl-4-hydroxyphenyl)propane, 2,2-bis(3-ethyl-4-hydroxyphenyl)propane, 2,2-bis(3-n-propyl-4-hydroxyphenyl)propane, 2,2-bis(3-isopropyl-4-hydroxyphenyl)propane, 2,2-bis(3-sec-butyl-4-hydroxyphenyl)propane, 2,2-bis(3-t-butyl-4-hydroxyphenyl)propane, 2,2-bis(3-cyclohexyl-4-hydroxyphenyl)propane, 2,2-bis(3-allyl-4-hydroxyphenyl)propane, 2,2-bis(3-methoxy-4-hydroxyphenyl)propane, 2,2-bis(4-hydroxyphenyl)hexafluoropropane, 1,1-dichloro-2,2-bis(4-hydroxyphenyl)ethylene, 1,1-dibromo-2,2-bis(4-hydroxyphenyl)ethylene, 1,1-dichloro-2,2-bis(5-phenoxy-4-hydroxyphenyl)ethylene, 4,4'-dihydroxybenzophenone, 3,3-bis(4-hydroxyphenyl)-2-butanone, 1,6-bis(4-hydroxyphenyl)-1,6-hexanedione, ethylene glycol bis(4-hydroxyphenyl)ether, bis(4-hydroxyphenyl)ether, bis(4-hydroxyphenyl)sulfide, bis(4-hydroxyphenyl)sulfoxide, bis(4-hydroxyphenyl)sulfone, 9,9-bis(4-hydroxyphenyl)fluorene, 2,7-dihydroxypyrene, 6,6'-dihydroxy-3,3,3',3'-tetramethylspiro(bis)indane ("spirobiindane bisphenol"), 3,3-bis(4-hydroxyphenyl)phthalide, 2,6-dihydroxydibenzo-p-dioxin, 2,6-dihydroxythianthrene, 2,7-dihydroxyphenoxathin, 2,7-dihydroxy-9,10-dimethylphenazine, 3,6-dihydroxydibenzofuran, 3,6-dihydroxydibenzothiophene, and 2,7-dihydroxycarbazole, and the like, as well as combinations comprising at least one of the foregoing dihydroxy aromatic compounds.

Examples of the types of bisphenol compounds represented by formula (3) may include 1,1-bis(4-hydroxyphenyl) methane, 1,1-bis(4-hydroxyphenyl)ethane, 2,2-bis(4-hydroxyphenyl)propane (also referred to as "bisphenol A" or "BPA"), 2,2-bis(4-hydroxyphenyl)butane, 2,2-bis(4-hydroxyphenyl)octane, 1,1-bis(4-hydroxyphenyl)propane, 1,1-bis(4-hydroxyphenyl)n-butane, 2,2-bis(4-hydroxy-1-methylphenyl)propane, 1,1-bis(4-hydroxy-t-butylphenyl)propane, 3,3-bis(4-hydroxyphenyl)phthalimidine, 2-phenyl-3,3-bis(4-hydroxyphenyl)phthalimidine ("PBPP"), 9,9-bis(4-hydroxyphenyl)fluorene, and 1,1-bis(4-hydroxy-3-methylphenyl)cyclohexane ("DMBPC"). Combinations comprising at least one of the foregoing dihydroxy aromatic compounds can also be used.

The dihydroxy compounds of formula (3) may be the following formula (8) for high heat applications:

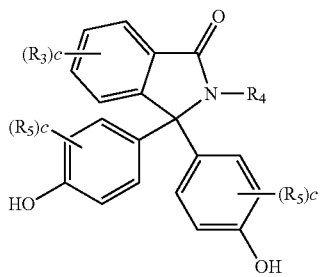

(8)

wherein $R_3$ and $R_5$ are each independently a hydrogen, halogen, or a $C_{1-6}$ alkyl group, $R_4$ is a $C_{1-6}$ alkyl, phenyl, or phenyl substituted with up to five halogens or $C_{1-6}$ alkyl groups, and c is 0 to 4. In a specific embodiment, $R_4$ is a $C_{1-6}$ alkyl or phenyl group. In still another embodiment, $R_4$ is a methyl or phenyl group. In another specific embodiment, each c is 0.

The dihydroxy compounds of formula (3) may be the following formula (9) for high heat applications:

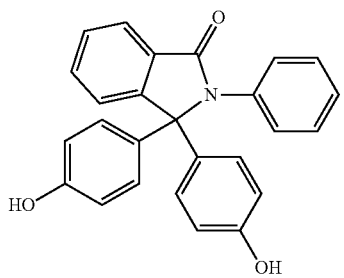

(9)

(also known as 3,3-bis(4-hydroxyphenyl)-2-phenylisoindolin-1-one (PPPBP)).

Alternatively, the dihydroxy compounds of formula (3) may be the following formula (10) for high heat applications:

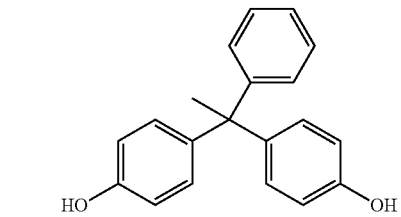

(10)

(also known as 4,4'-(1-phenylethane-1,1-diyl)diphenol (bisphenol AP) or 1,1-bis(4-hydroxyphenyl)-1-phenylethane).

Alternatively, the dihydroxy compounds of formula (3) may be 1,1-bis(4-hydroxyphenyl)-3,3,5-trimethylcyclohexane) or (bisphenol TMC) the following formula (11) for high heat applications:

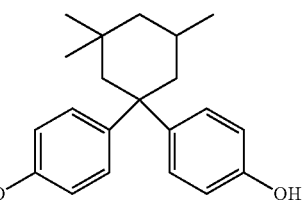

(11)

4,4'-(3,3,5-trimethylcyclohexane-1,1-diyl)diphenol

Other dihydroxy compounds that might impart high Tgs to the first polycarbonate as a homopolycarbonate or copolycarbonate are dihydroxy compounds having adamantane units, as described in U.S. Pat. No. 7,112,644 and U.S. Pat. No. 3,516,968, which are fully incorporated herein by reference. A compound having adamantane units may have repetitive units of the following formula (12) for high heat applications:

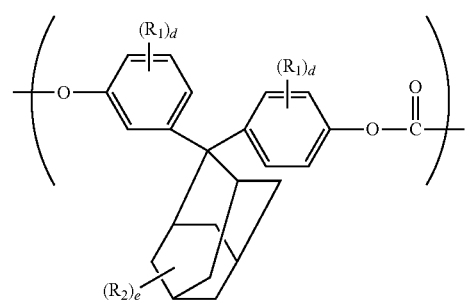

(12)

wherein $R_1$ represents a group selected from the group of a halogen atom, an alkyl group having 1 to 6 carbon atoms, an alkoxy group having 1 to 6 carbon atoms, an aryl group having 6 to 12 carbon atoms, an aryl-substituted alkenyl group having 7 to 13 carbon atoms and a fluoroalkyl group having 1 to 6 carbon atoms; $R_2$ represents a group selected from the group of a halogen atom, an alkyl group having 1 to 12 carbon atoms, an alkoxy group having 1 to 12 carbon atoms, an aryl group having 6 to 12 carbon atoms, an aryl-substituted alkenyl group having 7 to 13 carbon atoms and a fluoroalkyl group having 1 to 12 carbon atoms; d represents an integer of 0 to 4; and e represents an integer of 0 to 14.

Other dihydroxy compounds that might impart high Tgs to the first polycarbonate as a homopolycarbonate or copolycarbonate are dihydroxy compounds having fluorene-units, as described in U.S. Pat. No. 7,244,804. One such fluorene-unit containing dihydroxy compound is represented by the following formula (13) for high heat applications:

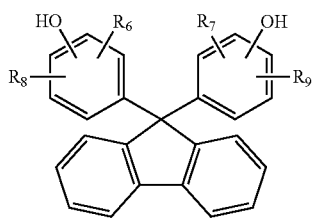

(13)

wherein $R_6$ to $R_9$ are each independently a hydrogen atom, a hydrocarbon group with 1 to 9 carbon atoms which may contain an aromatic group, or a halogen atom.

Isosorbide-Containing Polycarbonate

The polycarbonate may be a copolymer comprising homopolycarbonate units as described above in (1) and other types of polymer units such an isosorbide containing polycarbonate. The isosorbide-bisphenol isosorbide-bisphenol for making polymers may be represented by formula (14):

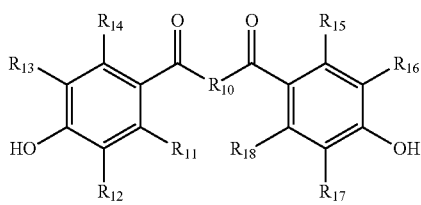

(14)

wherein $R_{10}$ is an isosorbide unit and $R_{11}$-$R_{18}$ may be independently selected from the group consisting of a hydrogen, a halogen, a $C_{1-6}$ alkyl, a methoxy, an ethoxy, and an alkyl ester.

The isosorbide unit may be represented by formula (15):

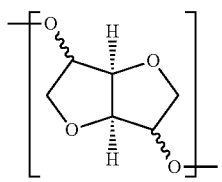

(15)

The isosorbide unit may be derived from an isosorbide, a mixture of isosorbide, a mixture of isomers of isosorbide, and/or from individual isomers of isosorbide. The stereochemistry for the isosorbide-based carbonate units of formula (16) is not particularly limited. Specifically, an isosorbide monomer unit has the general formula (16):

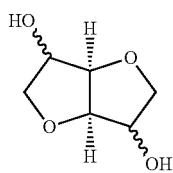

(16)

and can be a single diol isomer or mixture of diol isomers. The stereochemistry for the isosorbide of formula (16) is also not particularly limited. These diols may be prepared by the dehydration of the corresponding hexitols. Hexitols are produced commercially from the corresponding sugars (aldohexose). Aliphatic diols of formula (16) include 1,4:3,6-dianhydro-D glucitol, of formula (17); 1,4:3,6-dianhydro-D mannitol, of formula (18); and 1,4:3,6-dianhydro-L iditol, of formula (19), and any combination thereof. Isosorbides are available commercially from various chemical suppliers including Cargill, Roquette, and Shanxi.

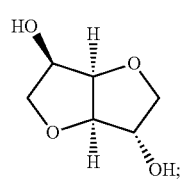

(17)

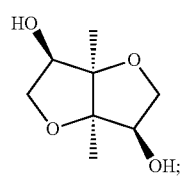

(18)

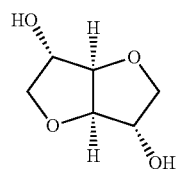

(19)

The diol of formula (19) may be desirable because it is a rigid, chemically and thermally stable aliphatic diol that may be used to produce higher Tg copolymers than the other diols of formulas (17) and formula (18). The isosorbide-bisphenol may have a pKa of between 8 and 11.

Isosorbide-Bisphenol (Formula I)—Reacting Compound

The isosorbide-bisphenol reacting compound may react with the isosorbide-bisphenol represented by formula (14). The isosorbide-bisphenol reacting compound may be one or more of phosgene, a triphosgene, diacyl halide, dihaloformate, dicyanate, diester, diepoxy, diarylcarbonate, dianhydride, dicarboxylic acid, and/or diacid chloride. The isosorbide-bisphenol reacting compound and the isosorbide-bisphenol may react under polymerization conditions to form a polymer structural unit, which can be polymerized.

Other Monomers

The one or more isosorbide-bisphenol structural unit(s), which may be identical or different, may be polymerized with one or more other non-isosorbide-containing monomer compounds ("other monomers") (e.g. a second, third, fourth, fifth, sixth, etc., monomer compound). The other monomer(s) or compounds may be optionally selected for incorporation into the product polymer. Therefore, the polymers or polycarbonates may be isosorbide-containing copolymers.

The isosorbide-bisphenol monomers and other monomers may be randomly incorporated into the polymer. For example, the copolymer may be arranged in an alternating sequence following a statistical distribution, which is independent of the mole ratio of the structural units present in the polymer chain. A random copolymer may have a structure, which can be indicated by the presence of several block sequences of isosorbide-containing monomers (I-I) and other monomers (O-O) and alternate sequences (I-O) or (O-I), that follow a statistical distribution. In a random x:(1−x) copolymer, wherein x is the mole percent of the other monomer(s) and 1−x is the mole percent of the isosorbide-containing monomer, one can calculate the distribution of each monomer using peak area values determined by $^{13}$C NMR, for example.

The copolymer may have alternating copolymers with regular alternating I and O units (-I-O-I-O-I-O-I-O-), I and O units arranged in a repeating sequence (e.g. a periodic copolymer having the formula: (-I-O-I-O-O-I-I-I-O-O-O-). The copolymer may be a statistical copolymer in which the sequence of monomer residues follows a statistical rule. For example, if the probability of finding a given type monomer residue at a particular point in the chain is equal to the mole fraction of that monomer residue in the chain, then the polymer may be referred to as a truly random copolymer. The copolymer may be a block copolymer that comprises two or more homopolymer subunits linked by covalent bonds (-I-I-I-I-I-O-O-O-O-O-). The union of the homopolymer subunits may require an intermediate non-repeating subunit, known as a junction block. Block copolymers with two or three distinct blocks are called diblock copolymers and triblock copolymers, respectively.

The other monomer may be a dihydroxy compound. The dihydroxy compound may be represented by formula (20):

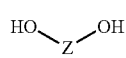
(20)

wherein Z may be an aromatic compound or an aliphatic compound.

The dihydroxy compound may be any bisphenol compound. The dihydroxy compound may be a 4,4'-(3,3,5-trimethylcyclohexylidene)diphenol; a 4,4'-bis(3,5-dimethyl) diphenol, a 1,1-bis(4-hydroxy-3-methylphenyl)cyclohexane, a 1,1-bis(4'hydroxy-3'methylphenyl)cyclohexane (DMBPC), a 4,4'-1-methyl-4-(1-methyl-ethyl)-1,3-cyclohexandiyl]bisphenol (1,3 BHPM), a 4-[1-[3-(4-hydroxyphenyl)-4-methylcyclohexyl]-1-methyl-ethyl]-phenol (2,8 BHPM), a 3,8-dihydroxy-5a,10b-diphenyl-coumarano-2',3', 2,3-coumarane (DCBP), a 2-phenyl-3,3-bis(4-hydroxyphenyl)heptane, a 2,4'-dihdroxydiphenylmethane, a bis(2-hydroxyphenyl)methane, a bis(4-hydroxyphenyl)methane, a bis (4-hydroxy-5-nitrophenyl)methane, a bis(4-hydroxy-2,6-dimethyl-3-methoxyphenyl)methane, a 1,1-bis(4-hydroxyphenyl)ethane, a 1,1-bis(4-hydroxy-2-chlorophenyl) ethane, a 2,2-bis(4-hydroxyphenyl)propane (BPA), a 2,2-bis (3-phenyl-4-hydroxyphenyl)propane, a 2,2-bis(4-hydroxy-3-methylphenyl)propane, a 2,2-bis(4-hydroxy-3-ethylphenyl)propane, a 2,2-bis(4-hydroxy-3-isopropylphenyl)propane, a 2,2-bis(4-hydroxy-3,5-dimethylphenyl)propane, a 2,2-bis(3,5,3',5'-tetrachloro-4,4'-dihydroxyphenyl)propane, a bis(4-hydroxyphenyl) cyclohexymethane, a 2,2-bis(4-hydroxyphenyl)-1-phenylpropane, a 2,4-dihydroxyphenyl sulfone, 4,4'-dihydroxydiphenylsulfone (BPS), bis(4-hydroxyphenyl) methane (bisphenol F, BPF), a 4,4'dihydroxy-1,1-biphenyl, 2,6-dihydroxy naphthalene, a hydroquinone, a resorcinol, a C1-3 alkyl-substituted resorcinol, a 3-(4-hydroxyphenyl)-1, 1,3-trimethylindan-5-ol, a 1-(4-hydroxyphenyl)-1,3,3-trimethylindan-5-ol, or a 2,2,2',2'-tetrahydro-3,3,3',3'-tetramethyl-1,1'-spirobi[1H-indene]-6,6'-diol. The dihydroxy compound may be 1,3-propylene glycol, 1,2-propylene glycol, 2,2-diethyl-1,3-propanediol, 2,2-dimethyl-1,3-propanediol, 2-ethyl-2-butyl-1,3-polypropanediol, 2-ethyl-2-isobutyl-1,3-propanediol, 1,3-terbutanediol, 1,4-butanediol, 1,5-pentanediol, 1,6-hexanediol, 2,2,4-trimethyl-1,6-hexanediol, 1,3-cyclohexanedimethanol, 1,4-cyclohexanedimethanol, or a 2,2,4,4-tetramethyl-1,3-cyclobutanediol.

Isosorbide-Containing Polymers

The isosorbide-bisphenol polycarbonate may be polymerized to form a homopolymer, the isosorbide-bisphenol may be polymerized with one or more, other isosorbide-bisphenol structural units and/or it may be polymerized with one or more other non-isosorbide-containing monomers to form a copolymer. The homopolymers may be manufactured by selecting and reacting a single polymerizable isosorbide-containing monomer. Copolymers can be manufactured by selecting and reacting two or more different polymerizable monomers, wherein at least one monomer is an isosorbide-containing monomer, such as isosorbide bisphenol-containing structural unit. The isosorbide-containing polymer may be a polyurethane, a polyurea, a polyarylate, a polyester, a polyether, a polyetheramide, a polyformal, or a polyphenylene ether.

The polymer may have a weight average molecular weight (Mw): of about 3,000 to about 150,000, of about 10,000 to about 125,000, of about 50,000 to about 100,000, or of about 75,000 to about 90,000, and a glass transition temperature (Tg): of about 80° C. to about 300° C., of about 100° C. to about 275° C., of about 125° C. to about 250° C., of about 150° C. to about 225° C., or of about 175° C. to about 200° C. The polymer may have a high mechanical strength. The elastic modulus may be: about 2.0 GPa to about 6 GPa, or about 3.0 GPa to about 5 GPa, as determined by, for example, an instrumented indentation technique. The polymer may have a hardness: of about 150 MPa to about 350 MPa, of about 200 MPa to about 325 MPa, of about 225 MPa to about 300 MPa, or of about 250 MPa to about 275 MPa. The polymer may have a Fries product concentration of: less than about 500 ppm, less than about 400 ppm, less than about 300 ppm, less than about 200 ppm, or less than about 100 ppm. The Fries product concentration may be determined by high performance liquid chromatography (HPLC). The polymer may exhibit lower refractive index (RI), higher scratch resistance and/or lower oxygen permeability compared to conventional homo- or copolymers. The polymer may be optically active.

The herein described polymers may be blended with other polymers, such as thermoplastics and thermosets. The herein described polymers may be blended with polycarbonates including, but not limited to, conventional BPA polycarbonate and polycarbonates made using monomers such as resorcinol, 1,1-bis(4'-hydroxy-3'methyl phenyl)cyclohexane and 4,4'[1-methyl-4-methylethyl)-1,3-cyclohexandiyl]bisphenol. The herein described polymers may be blended with an aliphatic polyester. The aliphatic polyester may be polycyclohexylidene cyclohexanedicarboxylate (PCCD).

Poly(Aliphatic Ester)-Polycarbonate

The polycarbonate may be a copolymer comprising homopolycarbonate units as described above in 2b(1) and other types of polymer units such as polyester units. A specific type of copolymer may be a poly(aliphatic ester)-polycarbonate, also known as a polyester-polycarbonate. As used herein, these terms are synonymous. The composition may comprise at least one poly(aliphatic ester)-polycarbonates, and in another embodiment, at least two poly(aliphatic ester)-polycarbonates. Poly(aliphatic ester)-polycarbonates can be generally described by formula (21a). Such copolymers further contain, in addition to recurring carbonate chain units of the formula (1) as described above, repeating ester units of formula (21a)

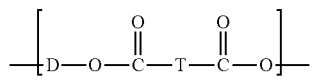
(21a)

wherein O-D-O of formula (21a) is a divalent group derived from a dihydroxy compound, and D may be, for example, one or more alkyl containing $C_{6-20}$ aromatic group(s), or one or more $C_{6-20}$ aromatic group(s), a $C_{2-10}$ alkylene group, a $C_{6-20}$ alicyclic group, a $C_{6-20}$ aromatic group or a polyoxyalkylene group in which the alkylene groups contain 2 to about 6 carbon atoms, specifically 2, 3, or 4 carbon atoms. D may be a $C_{2-30}$ alkylene group having a straight chain, branched chain, or cyclic (including polycyclic) structure. O-D-O may be derived from an aromatic dihydroxy compound of formula (3) above. O-D-O may be derived from an aromatic dihydroxy compound of formula (4) above. O-D-O may be derived from an aromatic dihydroxy compound of formula (21a) above.

The molar ratio of ester units to carbonate units in the copolymers may vary broadly, for example 1:99 to 99:1, specifically 10:90 to 90:10, more specifically 25:75 to 75:25, optionally expanded depending on the desired properties of the final composition.

T of formula (21a) may be a divalent group derived from a dicarboxylic acid, and may be, for example, a $C_{2-10}$ alkylene group, a $C_{6-20}$ alicyclic group, a $C_{6-20}$ alkyl aromatic group, a $C_{6-20}$ aromatic group, or a $C_6$ to $C_{36}$ divalent organic group derived from a dihydroxy compound or chemical equivalent thereof. T may be an aliphatic group, wherein the molar ratio of carbonate units of formula (1) to ester units of formula (21a) in the poly(aliphatic ester)-polycarbonate copolymer is from 99:1 to 60:40; and 0.01 to 10 weight percent, based on the total weight of the polymer component, of a polymeric containing compound. T may be derived from a $C_{6-20}$ linear aliphatic alpha-omega (αΩ) dicarboxylic ester.

Diacids from which the T group in the ester unit of formula (21a) are derived include aliphatic dicarboxylic acid from 6 to about 36 carbon atoms, optionally from 6 to 20 carbon atoms. The $C_{6-20}$ linear aliphatic alpha-omega (αΩ) dicarboxylic esters may be adipic acid, sebacic acid, 3,3-dimethyl adipic acid, 3,3,6-trimethyl sebacic acid, 3,3,5,5-tetramethyl sebacic acid, azelaic acid, dodecanedioic acid, dimer acids, cyclohexane dicarboxylic acids, dimethyl cyclohexane dicarboxylic acid, norbornane dicarboxylic acids, adamantane dicarboxylic acids, cyclohexene dicarboxylic acids, $C_{14}$, $C_{18}$ and $C_{20}$ diacids.

The ester units of the poly(aliphatic ester)-polycarbonates of formula (21a) can be further described by formula (21b), wherein T is $(CH_2)_m$, where m is 4 to 40.

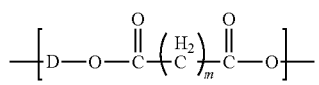
21b

Saturated aliphatic alpha-omega dicarboxylic acids may be adipic acid, sebacic or dodecanedioic acid. Sebacic acid is a dicarboxylic acid having the following formula (22):

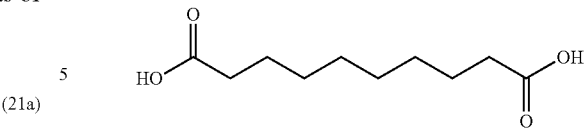
(22)

Sebacic acid has a molecular mass of 202.25 g/mole, a density of 1.209 g/cm³ (25° C.), and a melting point of 294.4° C. at 100 mmHg. Sebacic acid is derived from castor oil and is naturally occurring.

Other examples of aromatic dicarboxylic acids that may be used to prepare the polyester units include isophthalic or terephthalic acid, 1,2-di(p-carboxyphenyl)ethane, 4,4'-dicarboxydiphenyl ether, 4,4'-bisbenzoic acid, and combinations comprising at least one of the foregoing acids. Acids containing fused rings can also be present, such as in 1,4-, 1,5-, or 2,6-naphthalenedicarboxylic acids. Specific dicarboxylic acids may be terephthalic acid, isophthalic acid, naphthalene dicarboxylic acid, cyclohexane dicarboxylic acid, or combinations thereof. A specific dicarboxylic acid comprises a combination of isophthalic acid and terephthalic acid wherein the weight ratio of isophthalic acid to terephthalic acid is about 91:9 to about 2:98.

Overall, D of the poly(aliphatic ester)-polycarbonate may be a $C_{2-6}$ alkylene group and T may be p-phenylene, m-phenylene, naphthalene, a divalent cycloaliphatic group, or a combination thereof. This class of polyester includes the poly (alkylene terephthalates).

Mixtures of the diacids can also be employed. It should be noted that although referred to as diacids, any ester precursor could be employed such as acid halides, specifically acid chlorides, and diaromatic esters of the diacid such as diphenyl, for example the diphenyl ester of sebacic acid. With reference to the diacid carbon atom number earlier mentioned, this does not include any carbon atoms which may be included in the ester precursor portion, for example diphenyl. It may be desirable that at least four, five or six carbon bonds separate the acid groups. This may reduce the formation of undesirable and unwanted cyclic species.

The polyester unit of a poly(aliphatic ester)-polycarbonate may be derived from the reaction of a combination of isophthalic and terephthalic diacids (or derivatives thereof) with resorcinol. In another embodiment, the polyester unit of a poly(aliphatic ester)-polycarbonate may be derived from the reaction of a combination of isophthalic acid and terephthalic acid with bisphenol A. In an embodiment, the polycarbonate units may be derived from bisphenol A. In another specific embodiment, the polycarbonate units may be derived from resorcinol and bisphenol A in a molar ratio of resorcinol carbonate units to bisphenol A carbonate units of 1:99 to 99:1.

Useful polyesters may include aromatic polyesters, poly (alkylene esters) including poly(alkylene arylates), and poly (cycloalkylene diesters). Aromatic polyesters may have a polyester structure according to formula (21a), wherein D and T are each aromatic groups as described hereinabove. Useful aromatic polyesters may include, for example, poly(isophthalate-terephthalate-resorcinol) esters, poly(isophthalate-terephthalate-bisphenol A) esters, poly[(isophthalate-terephthalate-resorcinol) ester-co-(isophthalate-terephthalate-bisphenol A)]ester, or a combination comprising at least one of these.

The poly(aliphatic ester)-polycarbonate may have a biocontent according to ASTM-D-6866 of at least: 2 weight %, 3 weight %, 4 weight %, 5 weight %, 6 weight %, 7 weight %, 8 weight %, 9 weight %, 10 weight %, 11 weight %, 12 weight %, 13 weight %, 14 weight %, 15 weight %, 16 weight %, 17 weight %, 18 weight %, 19 weight %, 20 weight %, 25 weight %, 30 weight %, 35 weight %, 40 weight %, 45 weight %, 50 weight %, 55 weight %, 60 weight %, or 65 weight % of the composition derived therefrom. The poly(aliphatic ester)-polycarbonate may have a biocontent according to ASTM-D-6866 of at least 5 weight % of the blended composition. The polymer, or any composition derived therefrom, may have at least 5.0 weight % of sebacic acid content.

Sebacic Acid Containing Polyester-Polycarbonate Copolymer

The poly(aliphatic ester)-polycarbonate copolymer may be derived from sebacic acid. At least one polyester-polycarbonates derived from sebacic acid may be present in the composition. Overall at least one poly(aliphatic ester)-polycarbonate copolymer may have a polycarbonate (PC) molecular weight average between 28,000 to 41,000 g/mole as measured by gel permeation chromatography bisphenol A polycarbonate standards and a 4.0 mole % to 10.0 mole % sebacic acid (of the total composition). At least one poly(aliphatic ester)-polycarbonate copolymer may have a polycarbonate (PC) molecular weight average between 30,000 to 40,000 g/mole as measured by gel permeation chromatography bisphenol A polycarbonate standards, and a 7.0 mole % to 9.0 mole % sebacic acid (of the total composition). At least one poly(aliphatic ester)-polycarbonate copolymer may have a polycarbonate (PC) molecular weight average between 33,000 to 39,000 g/mole as measured by gel permeation chromatography bisphenol A polycarbonate standards and a 7.5 mole % to 8.5 mole % sebacic acid (of the total composition) or 8.25 mole % sebacic acid. At least one poly(aliphatic ester)-polycarbonate copolymer may have a polycarbonate (PC) molecular weight average of 35,000 g/mole as measured by gel permeation chromatography bisphenol A polycarbonate standards and a 8.25 mole % sebacic acid (of the total composition). The error rate of the molecular weight of HFD-HM may be $^{+/-}1000$ g/mole.

At least one poly(aliphatic ester)-polycarbonate copolymer may have a polycarbonate (PC) molecular weight average between 14,000 to 30,000 g/mole as measured by gel permeation chromatography bisphenol A polycarbonate standards and a 4.0 mole % to 11.0 mole % sebacic acid (of the total composition). At least one poly(aliphatic ester)-polycarbonate copolymer may have a polycarbonate (PC) molecular weight average between 16,000 to 27,000 g/mole as measured by gel permeation chromatography bisphenol A polycarbonate standards and a 5.0 mole % to 10.0 mole %, or 5.0 mole % to 7.0 mole % sebacic acid (of the total composition). At least one poly(aliphatic ester)-polycarbonate copolymer may have a polycarbonate (PC) molecular weight average between 19,000 to 24,000 g/mole as measured by gel permeation chromatography bisphenol A polycarbonate standards and a 7.0 mole % to 9.0 mole % sebacic acid (of the total composition). At least one poly(aliphatic ester)-polycarbonate copolymer may have a polycarbonate (PC) molecular weight average of 21,500 g/mole as measured by gel permeation chromatography bisphenol A polycarbonate standards and a 8.25 mole % sebacic acid (of the total composition). Overall, the poly(aliphatic ester)-polycarbonate copolymer may contain between: 1 to 10%, 2 to 13%, 3 to 11%, 4 to 10%, or 5 to 9% sebacic acid. The polyester-polycarbonate copolymer may contain greater than or equal to: 1.0%, 2.0%, 3.0%, 4.0%, 5.0%, 6.0%, 7.0%, 8.0%, 8.25%, 8.50%, 8.75%, 9.0%, 10.0%, 11.0%, 12.0%, 13.0%, 14.0%, or 15.0% sebacic acid. The error rate of the molecular weight of the polycarbonate of the poly(aliphatic ester)-polycarbonate may be $^{+/-}1000$ g/mole.

In one form, the poly(aliphatic ester)-polycarbonate copolymer may be derived from the reaction of sebacic acid with bisphenol A (BPA). Sebacic acid/BPA containing polyester-polycarbonate copolymer has the following formula (23) wherein a and b are a number suitable for a desired length and molecular weight:

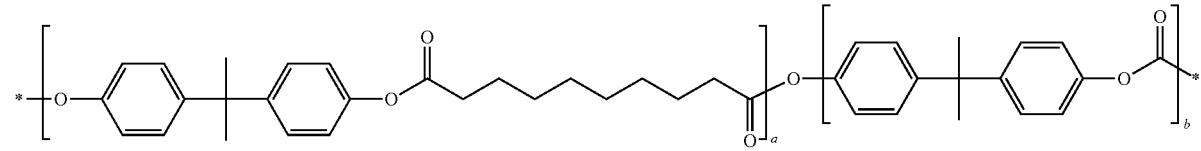

(23)

Formula (23) may be designed to be a ductile poly(aliphatic ester)-polycarbonate copolymer with a higher molecular weight polycarbonate (PAE-PC-1). Overall at least one polycarbonate of the ductile poly(aliphatic ester)-polycarbonate copolymer may have a molecular weight average between 28,000 to 42,000 g/mole as measured by gel permeation chromatography bisphenol A polycarbonate standards and a 4.0 mole % to 10.0 mole % sebacic acid (of the total composition). PAE-PC-1 may have a polycarbonate molecular weight average between 30,000 to 40,000 g/mole as measured by gel permeation chromatography bisphenol A polycarbonate standards and a 5.0 mole % to 11.0 mole % sebacic acid (of the total composition). PAE-PC-1 may have a polycarbonate molecular weight average between 33,000 to 39,000 g/mole as measured by gel permeation chromatography bisphenol A polycarbonate standards and a 7.5 mole % to 8.5 mole % sebacic acid (of the total composition). PAE-PC-1 may have a molecular weight average of 36,000 g/mole as measured by gel permeation chromatography bisphenol A polycarbonate standards and a 8.0 mole % sebacic acid (of the total composition). The error rate of the molecular weight of PAE-PC-1 may be $^{+/-}1000$ g/mole.

Formula (23) may be designed to be a ductile poly(aliphatic ester)-polycarbonate copolymer with a lower molecular weight polycarbonate (designated PAE-PC-2) with a lower molecular weight polycarbonate. At least one polycarbonate of the ductile poly(aliphatic ester)-polycarbonate copolymer may have a molecular weight average between 16,000 to 27,000 g/mole as measured by gel permeation chromatography bisphenol A polycarbonate standards and a 3.0 mole % to 9.0 mole % sebacic acid (of the total composition) or 5.0 mole % to 7.0 mole % sebacic acid. PAE-PC-2 may have a polycarbonate molecular weight average between 18,000 to 25,000 g/mole as measured by gel permeation chromatography bisphenol A polycarbonate standards and a 4.0 mole % to 8.0 mole % sebacic acid (of the total composition). PAE-PC-2 may have a polycarbonate molecular weight average between 19,000 to 24,000 g/mole as measured by gel, permeation chromatography bisphenol A polycarbonate standards and a 5.0 mole % to 7.0 mole % sebacic acid (of the total composition). PAE-PC-2 may have a polycarbonate molecular weight average of 21,000 g/mole as measured by gel permeation chromatography bisphenol A polycarbonate standards and a 6.0 mole % sebacic acid (of the total composition). The error rate of the molecular weight of HFD-LM may be $^{+/-}1000$ g/mole.

The sebacic acid derived poly(aliphatic ester) polycarbonate copolymer may have a biocontent according to ASTM-D-6866 of at least: 2 weight %, 3 weight %, 4 weight %, 5 weight %, 6 weight %, 7 weight %, 8 weight %, 9 weight %, 10 weight %, 11 weight %, 12 weight %, 13 weight %, 14 weight %, 15 weight %, 16 weight %, 17 weight %, 18 weight %, 19 weight %, 20 weight %, 25 weight %, 30 weight %, 35 weight %, 40 weight %, 45 weight %, 50 weight %, 55 weight %, 60 weight %, or 65 weight % of the composition derived therefrom. The poly(aliphatic ester) polycarbonate copolymer may have a biocontent according to ASTM-D-6866 of at least 5 weight %. The polymer, or any composition derived therefrom, may have at least 5.0 weight percent of sebacic acid content.

Level of Carboxylic Anhydride Groups

The poly(aliphatic ester) polycarbonate copolymer should have a low level of carboxylic anhydride groups. Anhydride groups are where two aliphatic diacids, or chemical equivalents, react to form an anhydride linkage. The amount of carboxylic acid groups bound in such anhydride linkages should be less than 10 mole % of the total amount of carboxylic acid content in the copolymer. In other embodiments, the anhydride content should be less than 5 mole % of carboxylic acid content in the copolymer, and in yet other embodiments, the carboxylic acid content in the copolymer should be less than 2 mole %. Low levels of anhydride groups can be achieved by known methods, for example conducting an interfacial polymerization reaction of dicarboxylic acid, bisphenol and phosgene initially at a low pH (from about 4 to 6) to get high incorporation of the diacid in the polymer, and then after a proportion of the monomer has been incorporated into the growing polymer chain, switching to a high pH (from about 10 to 11) to convert any anhydride groups into ester linkages. Anhydride linkages can be determined by numerous methods known in the art, for instance proton NMR analyses showing signal for the hydrogens adjacent to the carbonyl group. In an embodiment, the polyester-polycarbonate copolymer has a low amount of anhydride linkages, such as less than 5 mole %, specifically less than 3 mole %, and more specifically less than 2 mole %, as determined by proton NMR analysis. Low amounts of anhydride linkages in the polyester-polycarbonate copolymer contribute to superior melt stability in the copolymer, as well as other desirable properties.

Polycarbonate Polysiloxane Copolymers

The polycarbonate may be a copolymer comprising homopolycarbonate units as described above in formula (1) and other types of polymer units such as polysiloxane units. The polycarbonate structural unit of the polycarbonate-polysiloxane copolymer may be derived from carbonate units of formula (1) as described above. The carbonate units may be derived from one or more dihydroxy monomers of formula (3) including bisphenol compound of formula (4), both as described and incorporated herein from above. The dihydroxy compound may be bisphenol A.

The polysiloxane structural unit may be derived from siloxane-containing dihydroxy compounds (also referred to herein as "hydroxyaryl end-capped polysiloxanes") that contain diorganosiloxane units blocks of formula (24):

(24)

wherein each occurrence of R is same or different, and is a $C_{1-13}$ monovalent organic group. For example, R can be a $C_{1-13}$ alkyl group, $C_{1-13}$ alkoxy group, $C_{2-13}$ alkenyl group, $C_{2-13}$ alkenyloxy group, $C_{3-6}$ cycloalkyl group, $C_{3-6}$ cycloalkoxy group, $C_{6-13}$ aryl group, $C_{6-10}$ aryloxy group, $C_{7-13}$ aralkyl group, $C_{7-13}$ aralkoxy group, $C_{7-13}$ alkylaryl group, or $C_{7-13}$ alkylaryloxy group. The foregoing groups can be fully or partially halogenated with fluorine, chlorine, bromine, or iodine, or a combination thereof. In an embodiment, where a transparent polycarbonate is desired, R does not contain any halogen. Combinations of the foregoing R groups can be used in the same polycarbonate.

The value of E in formula (24) can vary widely depending on the type and relative amount of each of the different units in the polycarbonate, the desired properties of the polycarbonate, and like considerations. Generally, E can have an average value of about 2 to about 1,000, specifically about 2 to about 500, more specifically about 2 to about 100. In an embodiment, E has an average value of about 4 to about 90, specifically about 5 to about 80, and more specifically about 10 to about 70. Where E is of a lower value, e.g., less than about 40, it can be desirable to use a relatively larger amount of the units containing the polysiloxane. Conversely, where E is of a higher value, e.g., greater than about 40, it can be desirable to use a relatively lower amount of the units containing the polysiloxane.

In one embodiment, the polysiloxane blocks are provided by repeating structural units of formula (25):

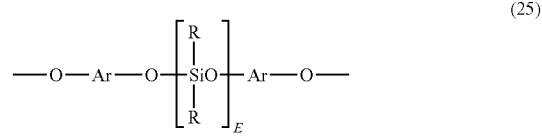

(25)

wherein E is as defined above; each R is the same or different, and is as defined above; and each Ar is the same or different, and Ar is one or more $C_{6-30}$ aromatic group(s), or one or more alkyl containing $C_{6-30}$ aromatic group(s), wherein the bonds are directly connected to an aromatic moiety. —O—Ar—O— groups in formula (10) can be, for example, a $C_{6-30}$ dihydroxyaromatic compound. Combinations comprising at least one of the foregoing dihydroxyaromatic compounds can also be used. Exemplary dihydroxyaromatic compounds are 1,1-bis(4-hydroxyphenyl)methane, 1,1-bis(4-hydroxyphenyl)ethane, 2,2-bis(4-hydroxyphenyl)propane, 2,2-bis(4-hydroxyphenyl)butane, 2,2-bis(4-hydroxyphenyl)octane, 1,1-bis(4-hydroxyphenyl)propane, 1,1-bis(4-hydroxyphenyl)n-butane, 2,2-bis(4-hydroxy-1-methylphenyl)propane, 1,1-bis(4-hydroxyphenyl)cyclohexane,-bis(4-hydroxyphenyl sulfide), 1,1-bis(4-hydroxy-3-methylphenyl)cyclohexane, and 1,1-bis(4-hydroxy-t-butylphenyl)propane, or a combination comprising at least one of the foregoing dihydroxy compounds.

Polycarbonates comprising such units can be derived from the corresponding dihydroxy compound of formula (26):

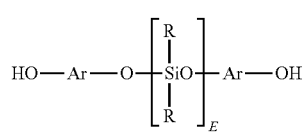

(26)

wherein Ar and E are as described above. Compounds of formula (26) can be obtained by the reaction of a dihydroxyaromatic compound with, for example, an alpha, omega-bis-acetoxy-polydiorganosiloxane oligomer under phase transfer conditions. Compounds of formula (26) can also be obtained from the condensation product of a dihydroxyaromatic compound, with, for example, an alpha, omega bis-chloro-polydimethylsiloxane oligomer in the presence of an acid scavenger.

In a specific embodiment, Ar from formula (26) is derived from resorcinol, and the polydiorganosiloxane repeating units are a dihydroxy aromatic compound of formula (27):

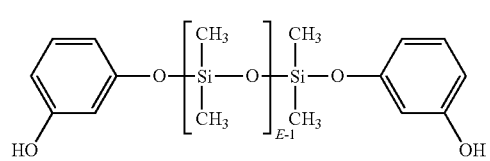

(27)

or, wherein Ar is derived from bisphenol A, and the polydiorganosiloxane repeating units are a dihydroxy aromatic compound of formula (28):

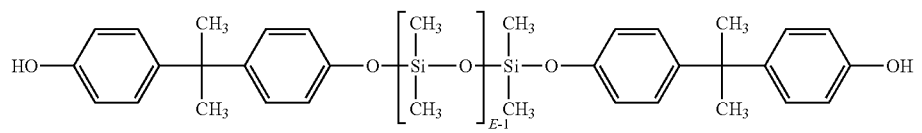

(28)

wherein E has an average value of between 20 and 75.

In another embodiment, polydiorganosiloxane blocks comprise units of formula (29):

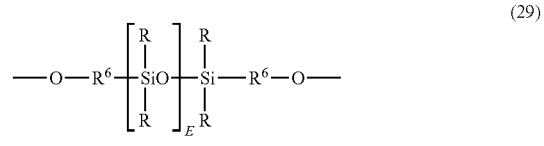

(29)

wherein R and E are as described above, and each $R^6$ is independently a divalent $C_{1-30}$ organic group such as a $C_{1-30}$ alkyl, $C_{1-30}$ aryl or $C_{1-30}$ alkylaryl. The polysiloxane blocks corresponding to formula (29) are derived from the corresponding dihydroxy compound of formula (30):

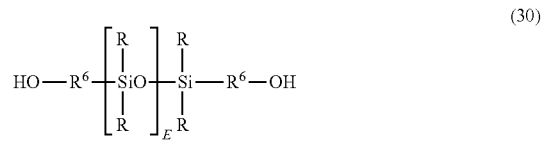

(30)

wherein R and E and $R^6$ are as described for formula (29).

In a specific embodiment, the second polycarbonate comprises carbonate units derived from a polysiloxane monomer having the structure (31):

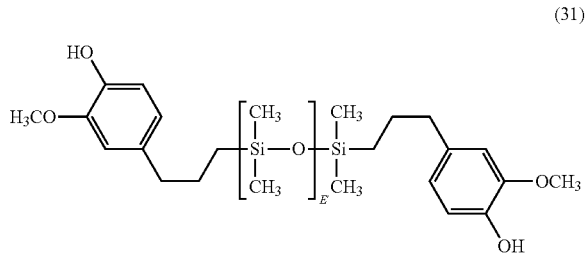

(31)

wherein E' is an average value of between 20 and 75.

In another specific embodiment the second polycarbonate comprises carbonate units derived from a polysiloxane monomer having the structure (32):

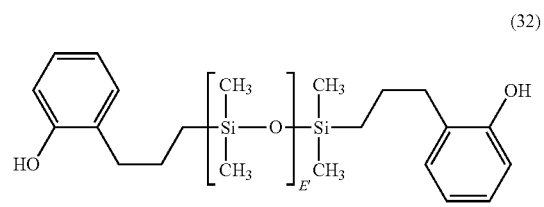

(32)

wherein E' is an average value of between 20 and 75.

In a specific embodiment, the polydiorganosiloxane blocks are provided by repeating structural units of formula (33):

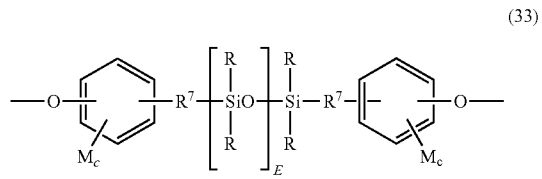
(33)

wherein R and E are as defined above. $R^7$ in formula (33) is a divalent $C_{2-8}$ aliphatic group. Each M in formula (29) can be the same or different, and is a halogen, cyano, nitro, $C_{1-8}$ alkylthio, $C_{1-8}$ alkyl, $C_{1-8}$ alkoxy, $C_{2-8}$ alkenyl, $C_{2-8}$ alkenyloxy group, $C_{3-8}$ cycloalkyl, $C_{3-8}$ cycloalkoxy, $C_{6-10}$ aryl, $C_{6-10}$ aryloxy, $C_{7-12}$ aralkyl, $C_{7-12}$ aralkoxy, $C_{7-12}$ alkylaryl, or $C_{7-12}$ alkylaryloxy, wherein each c is independently 0, 1, 2, 3, or 4.

In one embodiment, M of formula (33) is bromo or chloro, an alkyl group such as methyl, ethyl, or propyl, an alkoxy group such as methoxy, ethoxy, or propoxy, or an aryl group such as phenyl, chlorophenyl, or tolyl; c=0 to 4; $R^7$ is a dimethylene, trimethylene or tetramethylene group; and R is a $C_{1-8}$ alkyl, haloalkyl such as trifluoropropyl, cyanoalkyl, or aryl such as phenyl, chlorophenyl or tolyl. In another embodiment, R is methyl, or a combination of methyl and trifluoropropyl, or a combination of methyl and phenyl. In still another embodiment, M is methoxy, c is one, $R^7$ is a divalent $C_{1-3}$ aliphatic group, and R is methyl.

Polysiloxane-polycarbonates comprising units of formula (33) can be derived from the corresponding dihydroxy polydiorganosiloxane (34):

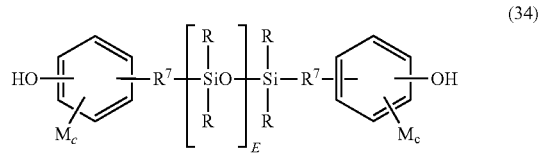
(34)

wherein each of R, E, M, $R^7$, and c are as described above. Such dihydroxy polysiloxanes can be made by affecting a platinum-catalyzed addition between a siloxane hydride of formula (35):

(35)

wherein R and E are as previously defined, and an aliphatically unsaturated monohydric phenol. Exemplary aliphatically unsaturated monohydric phenols included, for example, eugenol, 2-allylphenol, 4-allyl-2-methylphenol, 4-allyl-2-phenylphenol, 4-allyl-2-bromophenol, 4-allyl-2-t-butoxyphenol, 4-phenyl-2-phenylphenol, 2-methyl-4-propylphenol, 2-allyl-4,6-dimethylphenol, 2-allyl-4-bromo-6-methylphenol, 2-allyl-6-methoxy-4-methylphenol, 4-allylphenol, and 2-allyl-4,6-dimethylphenol. Combinations comprising at least one of the foregoing can also be used.

Method of Making Polycarbonate

Polycarbonates may be manufactured by processes such as interfacial polymerization and melt polymerization. High Tg copolycarbonates are generally manufactured using interfacial polymerization. Although the reaction conditions for interfacial polymerization can vary, an exemplary process generally involves dissolving or dispersing a dihydric phenol reactant in aqueous caustic soda or potash, adding the resulting mixture to a water-immiscible solvent medium, and contacting the reactants with a carbonate precursor in the presence of a catalyst such as, for example, a tertiary amine or a phase transfer catalyst, under controlled pH conditions, e.g., 8 to 10. The most commonly used water immiscible solvents include methylene chloride, 1,2-dichloroethane, chlorobenzene, toluene, and the like.

Exemplary carbonate precursors may include, for example, a carbonyl halide such as carbonyl bromide or carbonyl chloride, or a haloformate such as a bishaloformate of a dihydric phenol (e.g., the bischloroformate of bisphenol A, hydroquinone, or the like) or a glycol (e.g., the bishaloformate of ethylene glycol, neopentyl glycol, polyethylene glycol, or the like). Combinations comprising at least one of the foregoing types of carbonate precursors can also be used. For example, an interfacial polymerization reaction to form carbonate linkages uses phosgene as a carbonate precursor, and is referred to as a phosgenation reaction.

Among tertiary amines that can be used are aliphatic tertiary amines such as triethylamine, tributylamine, cycloaliphatic amines such as N,N-diethyl-cyclohexylamine and aromatic tertiary amines such as N,N-dimethylaniline.

Among the phase transfer catalysts that can be used are catalysts of the formula $(R^3)_4Q^+X$, wherein each $R^3$ is the same or different, and is a $C_{1-10}$ alkyl group; Q is a nitrogen or phosphorus atom; and X is a halogen atom or a $C_{1-8}$ alkoxy group or $C_{6-18}$ aryloxy group. Exemplary phase transfer catalysts include, for example, $[CH_3(CH_2)_3]_4NX$, $[CH_3(CH_2)_3]_4PX$, $[CH_3(CH_2)_5]_4NX$, $[CH_3(CH_2)_6]_4NX$, $[CH_3(CH_2)_4]_4NX$, $CH_3[CH_3(CH_2)_3]_3NX$, and $CH_3[CH_3(CH_2)_2]_3NX$, wherein X is $Cl^-$, $Br^-$, a $C_{1-8}$ alkoxy group or a $C_{6-18}$ aryloxy group. An effective amount of a phase transfer catalyst can be 0.1 to 10 weight % based on the weight of bisphenol in the phosgenation mixture. For example, an effective amount of phase transfer catalyst can be 0.5 to 2 weight % based on the weight of bisphenol in the phosgenation mixture.

The polycarbonate may be prepared by a melt polymerization process. Generally, in the melt polymerization process, polycarbonates are prepared by co-reacting, in a molten state, the dihydroxy reactant(s) (i.e. aliphatic diol and/or aliphatic diacid, and any additional dihydroxy compound) and a diaryl carbonate ester, such as diphenyl carbonate, or more specifically in an embodiment, an activated carbonate such as bis (methyl salicyl) carbonate, in the presence of a transesterification catalyst. The reaction may be carried out in typical polymerization equipment, such as one or more continuously stirred reactors (CSTR's), plug flow reactors, wire wetting fall polymerizers, free fall polymerizers, wiped film polymerizers, BANBURY* mixers, single or twin screw extruders, or combinations of the foregoing. Volatile monohydric phenol is removed from the molten reactants by distillation and the polymer is isolated as a molten residue. A specifically useful melt process for making polycarbonates uses a diaryl carbonate ester having electron-withdrawing substituents on the aryls. Examples of specifically useful diaryl carbonate esters with electron withdrawing substituents include bis(4-nitrophenyl)carbonate, bis(2-chlorophenyl)carbonate, bis(4-chlorophenyl)carbonate, bis(methyl salicyl)carbonate, bis(4-methylcarboxylphenyl)carbonate, bis(2-acetylphenyl) carboxylate, bis(4-acetylphenyl)carboxylate, or a combination comprising at least one of the foregoing.

End Capping Agent

All types of polycarbonate end groups are contemplated as being useful in the high and low Tg polycarbonates, provided that such end groups do not significantly adversely affect desired properties of the compositions. An end-capping agent (also referred to as a chain-stopper) can be used to limit molecular weight growth rate, and so control molecular weight of the first and/or second polycarbonate. Exemplary chain-stoppers include certain monophenolic compounds (i.e., phenyl compounds having a single free hydroxy group), monocarboxylic acid chlorides, and/or monochloroformates. Phenolic chain-stoppers are exemplified by phenol and $C_{1-22}$ alkyl-substituted phenols such as p-cumyl-phenol, resorcinol monobenzoate, and p- and tertiary-butyl phenol, cresol, and monoethers of diphenols, such as p-methoxyphenol. Alkyl-substituted phenols with branched chain alkyl substituents having 8 to 9 carbon atoms can be specifically mentioned.

Endgroups can be derived from the carbonyl source (i.e., the diaryl carbonate), from selection of monomer ratios, incomplete polymerization, chain scission, and the like, as well as any added end-capping groups, and can include derivatizable functional groups such as hydroxy groups, carboxylic acid groups, or the like. In an embodiment, the end-group of a polycarbonate can comprise a structural unit derived from a diaryl carbonate, where the structural unit can be an endgroup. In a further embodiment, the endgroup is derived from an activated carbonate. Such endgroups can derive from the transesterification reaction of the alkyl ester of an appropriately substituted activated carbonate, with a hydroxy group at the end of a polycarbonate polymer chain, under conditions in which the hydroxy group reacts with the ester carbonyl from the activated carbonate, instead of with the carbonate carbonyl of the activated carbonate. In this way, structural units derived from ester containing compounds or substructures derived from the activated carbonate and present in the melt polymerization reaction can form ester endgroups. In an embodiment, the ester endgroup derived from a salicylic ester can be a residue of bis(methyl salicyl) carbonate (BMSC) or other substituted or unsubstituted bis (alkyl salicyl)carbonate such as bis(ethyl salicyl)carbonate, bis(propyl salicyl)carbonate, bis(phenyl salicyl)carbonate, bis(benzyl salicyl)carbonate, or the like. In a specific embodiment, where BMSC is used as the activated carbonyl source, the endgroup is derived from and is a residue of BMSC, and is an ester endgroup derived from a salicylic acid ester, having the structure of formula (36):

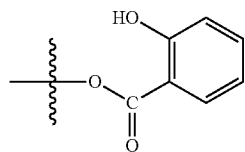

(36)

The reactants for the polymerization reaction using an activated aromatic carbonate can be charged into a reactor either in the solid form or in the molten form. Initial charging of reactants into a reactor and subsequent mixing of these materials under reactive conditions for polymerization may be conducted in an inert gas atmosphere such as a nitrogen atmosphere. The charging of one or more reactant may also be done at a later stage of the polymerization reaction. Mixing of the reaction mixture is accomplished by any methods known in the art, such as by stirring. Reactive conditions include time, temperature, pressure and other factors that affect polymerization of the reactants. Typically the activated aromatic carbonate is added at a mole ratio of 0.8 to 1.3, and more preferably 0.9 to 1.3, and all sub-ranges there between, relative to the total moles of monomer unit compounds. In a specific embodiment, the molar ratio of activated aromatic carbonate to monomer unit compounds is 1.013 to 1.290, specifically 1.015 to 1.028. In another specific embodiment, the activated aromatic carbonate is BMSC.

Branching Groups

Polycarbonates with branching groups are also contemplated as being useful, provided that such branching does not significantly adversely affect desired properties of the polycarbonate. Branched polycarbonate blocks can be prepared by adding a branching agent during polymerization. These branching agents include polyfunctional organic compounds containing at least three functional groups selected from hydroxyl, carboxyl, carboxylic anhydride, haloformyl, and mixtures of the foregoing functional groups. Specific examples include trimellitic acid, trimellitic anhydride, trimellitic trichloride, tris-p-hydroxy phenyl ethane, isatin-bis-phenol, tris-phenol TC (1,3,5-tris((p-hydroxyphenyl)isopropyl)benzene), tris-phenol PA (4(4(1,1-bis(p-hydroxyphenyl)-ethyl)alpha,alpha-dimethyl benzyl)phenol), 4-chloroformyl phthalic anhydride, trimesic acid, and benzophenone tetracarboxylic acid. The branching agents can be added at a level of about 0.05 to about 2.0 weight %. Mixtures comprising linear polycarbonates and branched polycarbonates can be used.

Other Additives

Impact Modifiers

The blended composition may further comprise impact modifiers. For example, the composition can further include impact modifier(s), with the proviso that the additives are selected so as to not significantly adversely affect the desired properties of the composition. Suitable impact modifiers may be high molecular weight elastomeric materials derived from olefins, monovinyl aromatic monomers, acrylic and methacrylic acids and their ester derivatives, as well as conjugated dienes. The polycarbonate blend composition formed from conjugated dienes can be fully or partially hydrogenated. The elastomeric materials can be in the form of homopolymers or copolymers, including random, block, radial block, graft, and core-shell copolymers. Combinations of impact modifiers may be used.

A specific type of impact modifier may be an elastomer-modified graft copolymer comprising (i) an elastomeric (i.e., rubbery) polymer substrate having a Tg: less than about 10° C., less than about 0° C., less than about −10° C., or between about −40° C. to −80° C., and (ii) a rigid polymer grafted to the elastomeric polymer substrate. Materials suitable for use as the elastomeric phase include, for example, conjugated diene rubbers, for example polybutadiene and polyisoprene; copolymers of a conjugated diene with less than about 50 weight % of a copolymerizable monomer, for example a monovinylic compound such as styrene, acrylonitrile, n-butyl acrylate, or ethyl acrylate; olefin rubbers such as ethylene propylene copolymers (EPR) or ethylene-propylene-diene monomer rubbers (EPDM); ethylene-vinyl acetate rubbers; silicone rubbers; elastomeric $C_{1-8}$ alkyl(meth)acrylates; elastomeric copolymers of $C_{1-8}$ alkyl(meth)acrylates with butadiene and/or styrene; or combinations comprising at least one of the foregoing elastomers. Materials suitable for use as the rigid phase include, for example, monovinyl aromatic monomers such as styrene and alpha-methyl styrene, and monovinylic monomers such as acrylonitrile, acrylic acid, methacrylic acid, and the $C_{1-6}$ esters of acrylic acid and methacrylic acid, specifically methyl methacrylate.

Specific impact modifiers include styrene-butadiene-styrene (SBS), styrene-butadiene rubber (SBR), styrene-ethylene-butadiene-styrene (SEBS), ABS (acrylonitrile-butadiene-styrene), acrylonitrile-ethylene-propylene-diene-styrene (AES), styrene-isoprene-styrene (SIS), methyl methacrylate-butadiene-styrene (MBS), and styrene-acrylonitrile (SAN). Exemplary elastomer-modified graft copolymers include those formed from styrene-butadiene-styrene (SBS), styrene-butadiene rubber (SBR), styrene-ethylene-butadiene-styrene (SEBS), ABS (acrylonitrile-butadiene-styrene), acrylonitrile-ethylene-propylene-diene-styrene (AES), styrene-isoprene-styrene (SIS), methyl methacrylate-butadiene-styrene (MBS), and styrene-acrylonitrile (SAN).

MBS may be derived from the following monomers:

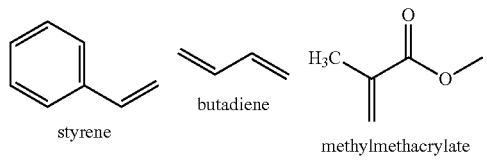

SEBS may be a linear triblockcopolymer based on styrene and ethylene/butylene. Each copolymer chain may consist of three blocks: a middle block that is a random ethylene/butylene copolymer surrounded by two blocks of polystyrene. The SEBS may be styrene-b-(ethylene-co-butylene)-b-styrene polymer.

Impact modifiers may be present in amounts of 1 to 30 parts by weight, based on 100 parts by weight of copolycarbonate, polysiloxane-polycarbonate, and any additional polymer. Impact modifiers may include MBS and SBS.

UV Stabilizers

The blended composition may further comprise a UV stabilizer for improved performance in UV stabilization. UV stabilizers disperse the UV radiation energy.

UV stabilizers may be hydroxybenzophenones, hydroxyphenyl benzotriazoles, cyanoacrylates, oxanilides, and hydroxyphenyl triazines. UV stabilizers may include, but are not limited to, poly[(6-morpholino-s-triazine-2,4-diyl)[2,2,6,6-tetramethyl-4-piperidyl)imino]-hexamethylene[(2,2,6,6-tetramethyl-4-piperidyl)imino], 2-hydroxy-4-octyloxybenzophenone (Uvinul*3008), 6-tert-butyl-2-(5-chloro-2H-benzotriazole-2-yl)-4-methylphenyl (Uvinul* 3026), 2,4-di-tert-butyl-6-(5-chloro-2H-benzotriazole-2-yl)-phenol (Uvinul*3027), 2-(2H-benzotriazole-2-yl)-4,6-di-tert-pentylphenol (Uvinul*3028), 2-(2H-benzotriazole-2-yl)-4-(1,1,3,3-tetramethylbutyl)-phenol (Uvinul* 3029), 1,3-bis[(2'cyano-3',3'-diphenylacryloyl)oxy]-2,2-bis-{[(2'-cyano-3',3'-diphenylacryloyl)oxy]methyl}-propane (Uvinul* 3030), 2-(2H-benzotriazole-2-yl)-4-methylphenol (Uvinul* 3033), 2-(2H-benzotriazole-2-yl)-4,6-bis(1-methyl-1-phenyethyl)phenol (Uvinul* 3034), ethyl-2-cyano-3,3-diphenylacrylate (Uvinul* 3035), (2-ethylhexyl)-2-cyano-3,3-diphenylacrylate (Uvinul* 3039), N,N'-bisformyl-N,N'-bis(2,2,6,6-tetramethyl-4-piperidinyl)hexamethylendiamine (Uvinul* 4050H), bis-(2,2,6,6-tetramethyl-4-pipieridyl)-sebacate (Uvinul* 4077H), bis-(1,2,2,6,6-pentamethyl-4-piperdiyl)-sebacate+methyl-(1,2,2,6,6-pentamethyl-4-piperidyl)-sebacate (Uvinul* 4092H) or combination thereof.

The blended composition may comprise one or more UV stabilizers, including Cyasorb 5411, Cyasorb UV-3638, Uvinul 3030, and/or Tinuvin 234.

Certain monophenolic UV absorbers, which can also be used as capping agents, can be utilized as one or more additives; for example, 4-substituted-2-hydroxybenzophenones and their derivatives, aryl salicylates, monoesters of diphenols such as resorcinol monobenzoate, 2-(2-hydroxyaryl)-benzotriazoles and their derivatives, 2-(2-hydroxyaryl)-1,3,5-triazines and their derivatives, and the like.

Colorants

The blended composition may further comprise colorants such as pigment and/or dye additives. Useful pigments may include, for example, inorganic pigments such as metal oxides and mixed metal oxides such as zinc oxide, titanium dioxides, iron oxides, or the like; sulfides such as zinc sulfides, or the like; aluminates; sodium sulfo-silicates sulfates, chromates, or the like; carbon blacks; zinc ferrites; ultramarine blue; organic pigments such as azos, di-azos, quinacridones, perylenes, naphthalene tetracarboxylic acids, flavanthrones, isoindolinones, tetrachloroisoindolinones, anthraquinones, enthrones, dioxazines, phthalocyanines, and azo lakes; Pigment Red 101, Pigment Red 122, Pigment Red 149, Pigment Red 177, Pigment Red 179, Pigment Red 202, Pigment Violet 29, Pigment Blue 15, Pigment Blue 60, Pigment Green 7, Pigment Yellow 119, Pigment Yellow 147, Pigment Yellow 150, and Pigment Brown 24; or combinations comprising at least one of the foregoing pigments. Pigments are generally used in amounts of 0.01 to 10 parts by weight, based on 100 parts by weight of the polymer component of the thermoplastic composition.

Exemplary dyes are generally organic materials and include, for example, coumarin dyes such as coumarin 460 (blue), coumarin 6 (green), nile red or the like; lanthanide complexes; hydrocarbon and substituted hydrocarbon dyes; polycyclic aromatic hydrocarbon dyes; scintillation dyes such as oxazole or oxadiazole dyes; aryl- or heteroaryl-substituted poly ($C_{2-8}$) olefin dyes; carbocyanine dyes; indanthrone dyes; phthalocyanine dyes; oxazine dyes; carbostyryl dyes; napthalenetetracarboxylic acid dyes; porphyrin dyes; bis(styryl)biphenyl dyes; acridine dyes; anthraquinone dyes; cyanine dyes; methine dyes; arylmethane dyes; azo dyes; indigoid dyes, thioindigoid dyes, diazonium dyes; nitro dyes; quinone imine dyes; aminoketone dyes; tetrazolium dyes; thiazole dyes; perylene dyes, perinone dyes; bis-benzoxazolylthiophene (BBOT); triarylmethane dyes; xanthene dyes; thioxanthene dyes; naphthalimide dyes; lactone dyes; fluorophores such as anti-stokes shift dyes which absorb in the near infrared wavelength and emit in the visible wavelength, or the like; luminescent dyes such as 7-amino-4-methylcoumarin; 3-(2'-benzothiazolyl)-7-diethylaminocoumarin; 2-(4-biphenylyl)-5-(4-t-butylphenyl)-1,3,4-oxadiazole; 2,5-bis-(4-biphenylyl)-oxazole; 2,2'-dimethyl-p-quaterphenyl; 2,2-dimethyl-p-terphenyl; 3,5,3'''',5''''-tetra-t-butyl-p-quinquephenyl; 2,5-diphenylfuran; 2,5-diphenyloxazole; 4,4'-diphenylstilbene; 4-dicyanomethylene-2-methyl-6-(p-dimethylaminostyryl)-4H-pyran; 1,1'-diethyl-2,2'-carbocyanine iodide; 3,3'-diethyl-4,4',5,5'-dibenzothiatricarbocyanine iodide; 7-dimethylamino-1-methyl-4-methoxy-8-azaquinolone-2; 7-dimethylamino-4-methylquinolone-2; 2-(4-(4-dimethylaminophenyl)-1,3-butadienyl)-3-ethylbenzothiazolium perchlorate; 3-diethylamino-7-diethyliminophenoxazonium perchlorate; 2-(1-naphthyl)-5-phenyloxazole; 2,2'-p-phenylen-bis(5-phenyloxazole); rhodamine 700; rhodamine 800; pyrene, chrysene, rubrene, coronene, or the like; or combinations comprising at least one of the foregoing dyes.

Dyes are generally used in amounts of 0.01 to 10 parts by weight, based on 100 parts by weight of the polycarbonate component of the blend composition.

Flame Retardants

The blended composition may further comprise flame retardants. Various types of flame retardants can also be utilized as additives. In one embodiment, the flame retardant additives include, for example, flame retardant salts such as alkali metal salts of perfluorinated $C_{1-16}$ alkyl sulfonates such as potassium perfluorobutane sulfonate (Rimar salt), potassium perfluoroctane sulfonate, tetraethylammonium perfluorohexane sulfonate, potassium diphenylsulfone sulfonate (KSS), and the like, sodium benzene sulfonate, sodium toluene sulfonate (NATS) and the like; and salts formed by reacting for example an alkali metal or alkaline earth metal (for example lithium, sodium, potassium, magnesium, calcium and barium salts) and an inorganic acid complex salt, for example, an oxo-anion, such as alkali metal and alkaline-earth metal salts of carbonic acid, such as $Na_2CO_3$, $K_2CO_3$, $MgCO_3$, $CaCO_3$, and $BaCO_3$ or fluoro-anion complex such as $Li_3AlF_6$, $BaSiF_6$, $KBF_4$, $K_3AlF_6$, $KAlF_4$, $K_2SiF_6$, and/or $Na_3AlF_6$ or the like. Rimar salt and KSS and NATS, alone or in combination with other flame retardants, are particularly useful in the polycarbonate compositions disclosed herein.

The flame retardants may be selected from at least one of the following: alkali metal salts of perfluorinated $C_{1-16}$ alkyl sulfonates; potassium perfluorobutane sulfonate; potassium perfluoroctane sulfonate; tetraethylammonium perfluorohexane sulfonate; and potassium diphenylsulfone sulfonate.

The flame retardant additives may include organic compounds that include phosphorus, bromine, and/or chlorine.

Preferably, the flame retardant is not a bromine or chlorine containing composition. Non-brominated and non-chlorinated phosphorus-containing flame retardants can be used in certain applications for regulatory reasons, for example organic phosphates and organic compounds containing phosphorus-nitrogen bonds. One type of exemplary organic phosphate is an aromatic phosphate of the formula $(GO)_3P=O$, wherein each G is independently an alkyl, cycloalkyl, aryl, alkylaryl, or arylalkyl group, provided that at least one G is an aromatic group. Two of the G groups can be joined together to provide a cyclic group, for example, diphenyl pentaerythritol diphosphate. Exemplary aromatic phosphates include, phenyl bis(dodecyl)phosphate, phenyl bis(neopentyl)phosphate, phenyl bis(3,5,5'-trimethylhexyl)phosphate, ethyl diphenyl phosphate, 2-ethylhexyl di(p-tolyl)phosphate, bis(2-ethylhexyl)p-tolyl phosphate, tritolyl phosphate, bis(2-ethylhexyl)phenyl phosphate, tri(nonylphenyl)phosphate, bis(dodecyl)p-tolyl phosphate, dibutyl phenyl phosphate, 2-chloroethyl diphenyl phosphate, p-tolyl bis(2,5,5'-trimethylhexyl)phosphate, 2-ethylhexyl diphenyl phosphate, or the like. A specific aromatic phosphate is one in which each G is aromatic, for example, triphenyl phosphate, tricresyl phosphate, isopropylated triphenyl phosphate, and the like.

Di- or poly-functional aromatic phosphorus-containing compounds are also useful as additives, for example, compounds of the formulas below:

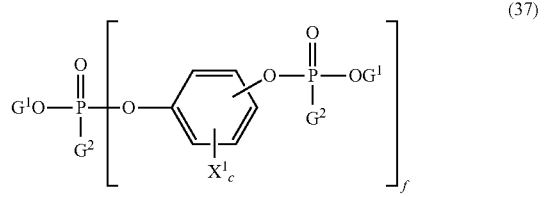

(37)

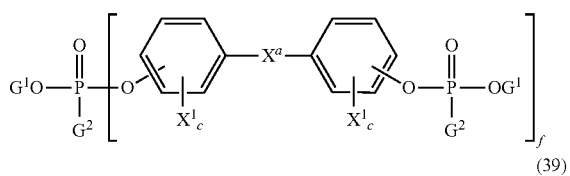

(38)

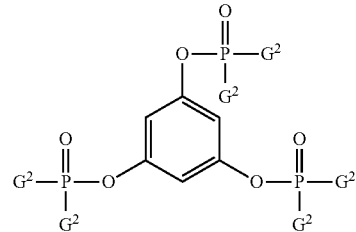

(39)

wherein each $G^1$ is independently a hydrocarbon having 1 to 30 carbon atoms; each $G^2$ is independently a hydrocarbon or hydrocarbonoxy having 1 to 30 carbon atoms; each $X^1$ is independently a bromine or chlorine; c is 0 to 4, and f is 1 to 30. Exemplary di- or polyfunctional aromatic phosphorus-containing compounds include resorcinol tetraphenyl diphosphate (RDP), the bis(diphenyl)phosphate of hydroquinone and the bis(diphenyl)phosphate of bisphenol A, respectively, their oligomeric and polymeric counterparts, and the like.

Exemplary flame retardant additives containing phosphorus-nitrogen bonds include phosphonitrilic chloride, phosphorus ester amides, phosphoric acid amides, phosphonic acid amides, phosphinic acid amides, tris(aziridinyl)phosphine oxide.

The flame retardant additive may have formula (40):

(40)

wherein $R_{19}$ is a $C_{1-36}$ alkylene, alkylidene or cycloaliphatic linkage, e.g., methylene, ethylene, propylene, isopropylene, isopropylidene, butylene, isobutylene, amylene, cyclohexylene, cyclopentylidene, or the like; or an oxygen ether, carbonyl, amine, or a sulfur-containing linkage, e.g., sulfide, sulfoxide, sulfone, or the like. $R_{19}$ can also consist of two or more alkylene or alkylidene linkages connected by such groups as aromatic, amino, ether, carbonyl, sulfide, sulfoxide, sulfone, or the like.

Ar" and Ar' in formula (40) are each independently mono- or polycarbocyclic aromatic groups such as phenylene, biphenylene, terphenylene, naphthylene, or the like.

$Y_1$ is an organic, inorganic, or organometallic radical, for example (1) halogen, e.g., chlorine, bromine, iodine, fluorine or (2) ether groups of the general formula OB, wherein B is a monovalent hydrocarbon group similar to $X_1$ or (3) monovalent hydrocarbon groups of the type represented by $R_{19}$ or (4) other substituents, e.g., nitro, cyano, and the like, said substituents being essentially inert provided that there is greater than or equal to one, specifically greater than or equal to two, halogen atoms per aryl nucleus. One or both of Ar" and Ar' may further have one or more hydroxyl substituents.

When present, each $X_1$ is independently a monovalent hydrocarbon group, for example an alkyl group such as methyl, ethyl, propyl, isopropyl, butyl, decyl, or the like; an aryl group such as phenyl, naphthyl, biphenyl, xylyl, tolyl, or the like; an aralkyl group such as benzyl, ethylphenyl, or the like; a cycloaliphatic group such as cyclopentyl, cyclohexyl, or the like. The monovalent hydrocarbon group can itself contain inert substituents.

Each g is independently 1 to a maximum equivalent to the number of replaceable hydrogens substituted on the aromatic rings comprising Ar" or Ar'. Each 1 is independently 0 to a maximum equivalent to the number of replaceable hydrogens on $R_{19}$. Each u, v, and w is independently a whole number; including 0. When v is not 0, neither u nor w can be 0. Otherwise either u or w, but not both, can be 0. Where v is 0, the aromatic groups are joined by a direct carbon-carbon bond.

The hydroxyl and $Y_1$ substituents on the aromatic groups, Ar" and Ar' can be varied in the ortho, meta or para positions on the aromatic rings and the groups can be in any possible geometric relationship with respect to one another.

Included within the scope of polymeric or oligomeric flame retardants derived from mono or dihydroxy derivatives of formula (40) are: 2,2-bis-(3,5-dichlorophenyl)-propane; bis-(2-chlorophenyl)-methane; bis(2,6-dibromophenyl)-methane; 1,1-bis-(4-iodophenyl)-ethane; 1,2-bis-(2,6-dichlorophenyl)-ethane; 1,1-bis-(2-chloro-4-iodophenyl)-ethane; 1,1-bis-(2-chloro-4-methylphenyl)-ethane; 1,1-bis-(3,5-dichlorophenyl)-ethane; 2,2-bis-(3-phenyl-4-bromophenyl)-ethane; 2,6-bis-(4,6-dichloronaphthyl)-propane; 2,2-bis-(2,6-dichlorophenyl)-pentane; 2,2-bis-(3,5-dibromophenyl)-hexane; bis-(4-chlorophenyl)-phenyl-methane; bis-(3,5-dichlorophenyl)-cyclohexylmethane; bis-(3-nitro-4-bromophenyl)-methane; bis-(4-hydroxy-2,6-dichloro-3-methoxyphenyl)-methane; 2,2-bis-(3,5-dichloro-4-hydroxyphenyl)-propane; and 2,2-bis-(3-bromo-4-hydroxyphenyl)-propane. Also included within the above structural formula are: 1,3-dichlorobenzene, 1,4-dibromobenzene, 1,3-dichloro-4-hydroxybenzene, and biphenyls such as 2,2'-dichlorobiphenyl, polybrominated 1,4-diphenoxybenzene, 2,4'-dibromobiphenyl, and 2,4'-dichlorobiphenyl as well as decabromo diphenyl oxide, and the like.

Another useful class of flame retardant is the class of cyclic siloxanes having the general formula $(R^8{}_2SiO)y$ wherein $R^8$ is a monovalent hydrocarbon or fluorinated hydrocarbon having from 1 to 18 carbon atoms and y is a number from 3 to 12. Examples of fluorinated hydrocarbon include, but are not limited to, 3-fluoropropyl, 3,3,3-trifluoropropyl, 5,5,5,4,4,3,3-heptafluoropentyl, fluorophenyl, difluorophenyl and trifluorotolyl. Examples of suitable cyclic siloxanes include, but are not limited to, octamethylcyclotetrasiloxane, 1,2,3,4-tetramethyl-1,2,3,4-tetravinylcyclotetrasiloxane, 1,2,3,4-tetramethyl-1,2,3,4-tetraphenylcyclotetrasiloxane, octaethylcyclotetrasiloxane, octapropylcyclotetrasiloxane, octabutylcyclotetrasiloxane, decamethylcyclopentasiloxane, dodecamethylcyclohexasiloxane, tetradecamethylcycloheptasiloxane, hexadecamethylcyclooctasiloxane, eicosamethylcyclodecasiloxane, octaphenylcyclotetrasiloxane, and the like. A particularly useful cyclic siloxane is octaphenylcyclotetrasiloxane.

When present, the foregoing flame retardant additives are generally present in amounts of 0.01 to 10 weight %, more specifically 0.02 to 5 weight %, based on 100 parts by weight of the polymer component of the thermoplastic composition.

In addition to the flame retardant, for example, the herein described polycarbonates and blends can include various additives ordinarily incorporated in polycarbonate compositions, with the proviso that the additives are selected so as to not significantly adversely affect the desired properties of the polycarbonate, such as transparency. Combinations of additives can be used. Such additives can be mixed at a suitable time during the mixing of the components for forming the polycarbonate and/or blend.

Heat Stabilizers

The blended composition may further comprise heat stabilizers. Exemplary heat stabilizer additives include, for example, organophosphites such as triphenyl phosphite, tris-(2,6-dimethylphenyl)phosphite, tris-(mixed mono- and di-nonylphenyl)phosphite or the like; phosphonates such as dimethylbenzene phosphonate or the like, phosphates such as trimethyl phosphate, or the like, or combinations comprising at least one of the foregoing heat stabilizers. Heat stabilizers are generally used in amounts of 0.0001 to 1 part by weight, based on 100 parts by weight of the polymer component of the thermoplastic composition.

Plasticizers, Lubricants, Mold Release Agents

The blended composition may further comprise plasticizers, lubricants, and mold release agents. Mold release agent (MRA) will allow the material to be removed quickly and effectively. Mold releases can reduce cycle times, defects, and browning of finished product. There is considerable overlap among these types of materials, which may include, for example, phthalic acid esters such as dioctyl-4,5-epoxy-hexahydrophthalate; tris-(octoxycarbonylethyl)isocyanurate; tristearin; di- or polyfunctional aromatic phosphates such as resorcinol tetraphenyl diphosphate (RDP), the bis (diphenyl)phosphate of hydroquinone and the bis(diphenyl) phosphate of bisphenol A; poly-alpha-olefins; epoxidized soybean oil; silicones, including silicone oils; esters, for example, fatty acid esters such as alkyl stearyl esters, e.g., methyl stearate, stearyl stearate, pentaerythritol tetrastearate (PETS), and the like; combinations of methyl stearate and hydrophilic and hydrophobic nonionic surfactants comprising polyethylene glycol polymers, polypropylene glycol polymers, poly(ethylene glycol-co-propylene glycol) copolymers, or a combination comprising at least one of the foregoing glycol polymers, e.g., methyl stearate and polyethylene-polypropylene glycol copolymer in a suitable solvent; waxes such as beeswax, montan wax, paraffin wax, or the like. Such materials are generally used in amounts of 0.001 to 1 part by weight, specifically 0.01 to 0.75 part by weight, more specifically 0.1 to 0.5 part by weight, based on 100 parts by weight of the polymer component of the thermoplastic composition.

Other Filler or Reinforcing Agents

The blended composition may further comprise other fillers or reinforcing agents. Possible fillers or reinforcing agents include, for example, silicates and silica powders such as aluminum silicate (mullite), synthetic calcium silicate, zirconium silicate, fused silica, crystalline silica graphite, natural silica sand, or the like; boron powders such as boron-nitride powder, boron-silicate powders, or the like; oxides such as $TiO_2$, aluminum oxide, magnesium oxide, or the like; calcium sulfate (as its anhydride, dihydrate or trihydrate); calcium carbonates such as chalk, limestone, marble, synthetic precipitated calcium carbonates, or the like; talc, including fibrous, modular, needle shaped, lamellar talc, or the like; wollastonite; surface-treated wollastonite; glass spheres such as hollow and solid glass spheres, silicate spheres, cenospheres, aluminosilicate (armospheres), or the like; kaolin, including hard kaolin, soft kaolin, calcined kaolin, kaolin comprising various coatings known in the art to facilitate compatibility with the polycarbonate polymeric matrix, or the like; single crystal fibers or "whiskers" such as silicon carbide, alumina, boron carbide, iron, nickel, copper, or the like; fibers (including continuous and chopped fibers) such as asbestos, carbon fibers, glass fibers, such as E, A, C, ECR, R, S, D, or NE glasses, or the like; sulfides such as molybdenum sulfide, zinc sulfide or the like; barium compounds such as barium titanate, barium ferrite, barium sulfate, heavy spar, or the like; metals and metal oxides such as particulate or fibrous aluminum, bronze, zinc, copper and nickel or the like; flaked fillers such as glass flakes, flaked silicon carbide, aluminum diboride, aluminum flakes, steel flakes or the like; fibrous fillers, for example short inorganic fibers such as those derived from blends comprising at least one of aluminum silicates, aluminum oxides, magnesium oxides, and calcium sulfate hemihydrate or the like; natural fillers and reinforcements, such as wood flour obtained by pulverizing wood, fibrous products such as cellulose, cotton, sisal, jute, starch, cork flour, lignin, ground nut shells, corn, rice grain husks or the like; organic fillers such as polytetrafluoroethylene; reinforcing organic fibrous fillers formed from organic polymers capable of forming fibers such as poly(ether ketone), polyimide, polybenzoxazole, poly(phenylene sulfide), polyesters, polyethylene, aromatic polyamides, aromatic polyimides, polyetherimides, polytetrafluoroethylene, acrylic resins, poly(vinyl alcohol) or the like; as well as additional fillers and reinforcing agents such as mica, clay, feldspar, flue dust, fillite, quartz, quartzite, perlite, tripoli, diatomaceous earth, carbon black, or the like, or combinations comprising at least one of the foregoing fillers or reinforcing agents.

The fillers and reinforcing agents can be coated with a layer of metallic material to facilitate conductivity, or surface treated with silanes to improve adhesion and dispersion with the polycarbonate polymeric matrix. In addition, the reinforcing fillers can be provided in the form of monofilament or multifilament fibers and can be used individually or in combination with other types of fiber, through, for example, co-weaving or core/sheath, side-by-side, orange-type or matrix and fibril constructions, or by other methods known to one skilled in the art of fiber manufacture. Exemplary co-woven structures include, for example, glass fiber-carbon fiber, carbon fiber-aromatic polyimide (aramid) fiber, and aromatic polyimide fiberglass fiber or the like. Fibrous fillers can be supplied in the form of, for example, rovings, woven fibrous reinforcements, such as 0-90 degree fabrics or the like; nonwoven fibrous reinforcements such as continuous strand mat, chopped strand mat, tissues, papers and felts or the like; or three-dimensional reinforcements such as braids. Fillers are generally used in amounts of 0 to 80 parts by weight, based on 100 parts by weight of the polymer component of the composition.

Antioxidant Additives

The blended composition may further comprise an antioxidant additive. Exemplary antioxidant additives include, for example, organophosphites such as tris(nonyl phenyl)phosphite, tris(2,4-di-t-butylphenyl)phosphite ("IRGAFOS 168" or "I-168"), bis(2,4-di-t-butylphenyl)pentaerythritol diphosphite, distearyl pentaerythritol diphosphite or the like; alkylated monophenols or polyphenols; alkylated reaction products of polyphenols with dienes, such as tetrakis[methylene (3,5-di-tert-butyl-4-hydroxyhydrocinnamate)]methane, or the like; butylated reaction products of para-cresol or dicyclopentadiene; alkylated hydroquinones; hydroxylated thiodiphenyl ethers; alkylidene-bisphenols; benzyl compounds; esters of beta-(3,5-di-tert-butyl-4-hydroxyphenyl)-propionic acid with monohydric or polyhydric alcohols; esters of beta-(5-tert-butyl-4-hydroxy-3-methylphenyl)-propionic acid with monohydric or polyhydric alcohols; esters of thioalkyl or thioaryl compounds such as distearylthiopropionate, dilaurylthiopropionate, ditridecylthiodipropionate, octadecyl-3-(3,5-di-tert-butyl-4-hydroxyphenyepropionate, pentaerythrityl-tetrakis[3-(3,5-di-tert-butyl-4-hydroxyphenyl) propionate or the like; amides of beta-(3,5-di-tert-butyl-4-hydroxyphenyl)-propionic acid or the like, or combinations comprising at least one of the foregoing antioxidants. Antioxidants are generally used in amounts of 0.0001 to 1 part by weight, based on 100 parts by weight of the polymer component of the thermoplastic composition (excluding any filler).

Antistatic Agents

The blended composition may further comprise an antistatic agent. Examples of monomeric antistatic agents may include glycerol monostearate, glycerol distearate, glycerol tristearate, ethoxylated amines, primary, secondary and tertiary amines, ethoxylated alcohols, alkyl sulfates, alkylarylsulfates, alkylphosphates, alkylaminesulfates, alkyl sulfonate salts such as sodium stearyl sulfonate, sodium dodecylbenzenesulfonate or the like, quaternary ammonium salts, quaternary ammonium resins, imidazoline derivatives, sorbitan esters, ethanolamides, betaines, or the like, or combinations comprising at least one of the foregoing monomeric antistatic agents.

Exemplary polymeric antistatic agents may include certain polyesteramides polyether-polyamide (polyetheramide) block copolymers, polyetheresteramide block copolymers, polyetheresters, or polyurethanes, each containing polyalkylene glycol moieties polyalkylene oxide units such as polyethylene glycol, polypropylene glycol, polytetramethylene glycol, and the like. Such polymeric antistatic agents are commercially available, for example PELESTAT* 6321 (Sanyo) or PEBAX* MH1657 (Atofina), IRGASTAT* P18 and P22 (Ciba-Geigy). Other polymeric materials may be used as antistatic agents are inherently conducting polymers such as polyaniline (commercially available as PANIPOL*EB from Panipol), polypyrrole and polythiophene (commercially available from Bayer), which retain some of their intrinsic conductivity after melt processing at elevated temperatures. Carbon fibers, carbon nanofibers, carbon nanotubes, carbon black, or a combination comprising at least one of the foregoing may be used in a polymeric resin containing chemical antistatic agents to render the composition electrostatically dissipative. Antistatic agents are generally used in amounts of 0.0001 to 5 parts by weight, based on 100 parts by weight of the polymer component of the thermoplastic composition.

Blowing Agents

The blended composition may further comprise blowing agent. Foam may be a useful blowing agent. Low boiling halohydrocarbons and those that generate carbon dioxide may be used as blowing agents. Blowing agents may be used that are solid at room temperature and when heated to temperatures higher than their decomposition temperature, generate gases such as nitrogen, carbon dioxide, and ammonia gas, such as azodicarbonamide, metal salts of azodicarbonamide, 4,4'oxybis(benzenesulfonylhydrazide), sodium bicarbonate, ammonium carbonate, or the like, or combinations comprising at least one of the foregoing blowing agents. Blowing agents may be used in amounts of 0.01 to 20 parts by weight, based on 100 parts by weight of the polymer component of the thermoplastic composition.

Anti-Drip Agents

The blended composition may further comprise anti-drip agents. The anti-drip agent may be a fibril forming or non-fibril forming fluoropolymer such as polytetrafluoroethylene (PTFE). The anti-drip agent can be encapsulated by a rigid copolymer as described above, for example styrene-acrylonitrile copolymer (SAN). PTFE encapsulated in SAN is known as TSAN. Encapsulated fluoropolymers can be made by polymerizing the encapsulating polymer in the presence of the fluoropolymer, for example an aqueous dispersion. TSAN can provide significant advantages over PTFE, in that TSAN can be more readily dispersed in the composition. An exemplary TSAN can comprise 50 weight % PTFE and 50 weight % SAN, based on the total weight of the encapsulated fluoropolymer. The SAN can comprise, for example, 75 weight % styrene and 25 weight % acrylonitrile based on the total weight of the copolymer. Alternatively, the fluoropolymer can be pre-blended in some manner with a second polymer, such as for, example, an aromatic polycarbonate or SAN to form an agglomerated material for use as an anti-drip agent. Either method can be used to produce an encapsulated fluoropolymer. Antidrip agents are generally used in amounts of 0.1 to 5 weight %, based on 100 parts by weight of the polymer component of the thermoplastic composition.

Radiation Stabilizers

The blended composition may further comprise radiation stabilizers. The radiation stabilizer may be a gamma-radiation stabilizer. Exemplary gamma-radiation stabilizers include alkylene polyols such as ethylene glycol, propylene glycol, 1,3-propanediol, 1,2-butanediol, 1,4-butanediol, meso-2,3-butanediol, 1,2-pentanediol, 2,3-pentanediol, 1,4-pentanediol, 1,4-hexandiol, and the like; cycloalkylene polyols such as 1,2-cyclopentanediol, 1,2-cyclohexanediol, and the like; branched alkylenepolyols such as 2,3-dimethyl-2,3-butanediol (pinacol), and the like, as well as alkoxy-substituted cyclic or acyclic alkanes. Unsaturated alkenols are also useful, examples of which include 4-methyl-4-penten-2-ol, 3-methyl-pentene-3-ol, 2-methyl-4-penten-2-ol, 2,4-dimethyl-4-penten-2-ol, and 9 to decen-1-ol, as well as tertiary alcohols that have at least one hydroxy substituted tertiary carbon, for example 2-methyl-2,4-pentanediol (hexylene glycol), 2-phenyl-2-butanol, 3-hydroxy-3-methyl-2-butanone, 2-phenyl-2-butanol, and the like, and cyclic tertiary alcohols such as 1-hydroxy-1-methyl-cyclohexane. Certain hydroxymethyl aromatic compounds that have hydroxy substitution on a saturated carbon attached to an unsaturated carbon in an aromatic ring can also be used. The hydroxy-substituted saturated carbon can be a methylol group (—CH$_2$OH) or it can be a member of a more complex hydrocarbon group such as —CR$^4$HOH or —CR$^4_2$OH wherein R$^4$ is a complex or a simple hydrocarbon. Specific hydroxy methyl aromatic compounds include benzhydrol, 1,3-benzenedimethanol, benzyl alcohol, 4-benzyloxy benzyl alcohol and benzyl benzyl alcohol. 2-methyl-2,4-pentanediol, polyethylene glycol, and polypropylene glycol are often used for gamma-radiation stabilization. Gamma-radiation stabilizing compounds are typically used in amounts of 0.1 to 10 parts by weight based on 100 parts by weight of the polymer component of the thermoplastic composition.

Mixers and Extruders—Method of Making the Composition

The blended composition can be manufactured by various methods. For example, the blended composition may be first blended in a high speed HENSCHEL-Mixer*. Other low shear processes, including but not limited to hand mixing, can also accomplish this blending. The blend may then be fed into the throat of a single or twin-screw extruder via a hopper. Alternatively, at least one of the components can be incorporated into the composition by feeding directly into the extruder at the throat and/or downstream through a side-stuffer. Additives can also be compounded into a masterbatch with a desired polymeric resin and fed into the extruder. The extruder is generally operated at a temperature higher than that necessary to cause the composition to flow. The extrudate is immediately quenched in a water batch and pelletized. The pellets, so prepared, when cutting the extrudate can be one-fourth inch long or less as desired. Such pellets can be used for subsequent molding, shaping, or forming.

Articles

The blended composition may be formed, shaped, molded or injection molded into an article. The article formed from the composition may have a impact value of: 45 kJ/m$^2$, 50 kJ/m$^2$, 55 kJ/m$^2$, 60 kJ/m$^2$, 65 kJ/m$^2$, 70 kJ/m$^2$, 75 kJ/m$^2$, 80 kJ/m$^2$, 85 kJ/m$^2$, or 90 kJ/m$^2$ at 23° C. according to ISO 180 m, or may have an impact strength average of greater than: 60 kJ/m$^2$, 65 kJ/m$^2$, 70 kJ/m$^2$, 75 kJ/m$^2$, 80 kJ/m$^2$, 85 kJ/m$^2$, 90 kJ/m$^2$, 100 kJ/m$^2$, or 110 kJ/m$^2$ at 23° C. according to ISO 180 wherein the article has at least one side with a thickness of at least: 0.15, 0.16, 0.17, 0.18, 0.19, 0.20, 0.21, 0.22, 0.23, 0.24, 0.25, 0.26, 0.27, 0.28, 0.29, 0.30, 0.31, 0.32, 0.33, 0.34, 0.35, 0.36, 0.37, 0.38, 0.39, or 0.40 mm. The error rate of measuring the impact strength may be $^{+/-}$5 kJ/m$^2$.

The polylactide compositions can be molded into useful shaped articles by a variety of means such as injection molding, extrusion, rotational molding, blow molding and thermoforming to form articles such as, for example, various components for cell phones and cell phone covers, components for computer housings, computer housings and business machine housings such as housings for monitors, handheld electronic device housings such as computer or business machine housings, housings for hand-held devices, components for light fixtures or home appliances, components for medical applications or devices, or components for interior or exterior components of an automobile, and the like.

The article may have a biocontent according to ASTM-D6866 of at least: 2 weight %, 3 weight %, 4 weight %, 5 weight %, 6 weight %, 7 weight %, 8 weight %, 9 weight %, 10 weight %, 11 weight %, 12 weight %, 13 weight %, 14 weight %, 15 weight %, 16 weight %, 17 weight %, 18 weight %, 19 weight %, 20 weight %, 25 weight %, 30 weight %, 35 weight %, 40 weight %, 45 weight %, 50 weight %, 55 weight %, 60 weight %, or 65 weight %.

Method of Making the Article from the Blended Composition

The article may be produced by a manufacturing process. The process may comprise the steps of (a) providing a blended copolymer comprising (i) one or more polyester-polycarbonates as described above wherein at least one of the polyester-polycarbonates has at least some structural units derived from sebacic acid, and (ii) a polylactide polymer. The blended copolymer from step (a) is then (b) melted between: 200 to 400° C., 225 to 350° C., 250 to 310° C., or 270 to 290° C. in an extruder. The blended copolymer of step (b) is then (c) extruded, and (d) the blended copolymer is isolated or chopped. The article of manufacture may further be produced by the steps of (e) drying the blended copolymer of (d) wherein the article has a melt volume rate of greater than or equal to 7.50 5 kg/5 minutes at 265° C. according to ILO1133, or greater than or equal to 2.50 5 kg/5 minutes at 240° C. according to ILO1133, and an impact strength of greater than 50 kJ/m$^2$, or greater than 60 kJ/m$^2$ at 23° C. according to ISO 180 or greater than 70 kJ/m$^2$ at 10° C. according to ISO 180 and overall biocontent greater than at least 20% or greater than at least 30%.

The present invention has multiple aspects, illustrated by the following non-limiting examples.

Example 1

Poli(aliphatic ester)-polycarbonate/PLA Blends with Similar Melt Volume Rates and Different Biocontents A number of different polycarbonate/polylactide (PLA) blends were used to measure various properties of formulations (i.e., ductility, impact strength, melt volume rate) in the Examples presented below. The poly(aliphatic ester)-polycarbonate used in the examples were either (a) a higher molecular weight copolymer with 8.25% sebacic acid and designated PAE-PC-1, or (b) a low molecular weight copolymer with 6.0% sebacic acid and designated PAE-PC-2. These copolymers were compared to three types of bisphenol-polycarbonates (BPA-PC) with different molecular weights (See Table 1).

The molecular weights (Mw) of the polymers listed in Table 1 were all measured by a standard gel permeation chromatography method using bisphenol A polycarbonate standards. The PAE-PC-1 and PAE-PC-2 resins were made by the method described in U.S. Pat. No. 6,833,422, which is herein incorporated by reference in its entirety.

The poly(aliphatic ester)-polycarbonate copolymer or BPA-PC polymer were blended with polylactic acid polymer (PLA). Table 1 summarized the types of polymers used in the Examples below.

TABLE 1

| Ingredient | Description | Supplier |
| --- | --- | --- |
| PC-1 | BPA polycarbonate resin having a PC Mw of 32,000 to 38,000 g/mole with phenol endcaps[1,3] | Sabic Innovative Plastics |
| PC-2 | BPA polycarbonate resin having a PC Mw of 27,000 to 33,000 g/mole with phenol endcaps[1,3] | Sabic Innovative Plastics |
| PC-3 | BPA polycarbonate resin having a PC Mw of 20,000 to 25,000 g/mole with para-cumylphenol (PCP) endcaps[1,3] | Sabic Innovative Plastics |
| PAE-PC-1 | Poly(aliphatic ester)-polycarbonate copolymer having a PC Mw of 33,000 to 39,000 g/mole with a biocontent in the range of 7.5-8.5% with PCP endcaps[1,4] | Sabic Innovative Plastics |
| PAE-PC-2 | Poly(aliphatic-ester)-polycarbonate copolymer having a PC Mw of 19,000 to 24,000 g/mole with a biocontent in the range of 5.0-7.5% with PCP endcaps[1,4] | Sabic Innovative Plastics |
| PLA-1 | A random copolymer of LL and DD lactide acid having a Mw of 160,000 to 200,000 g/mole[2,5] | Natureworks |
| TBPP | Tri(di-t-butylphenyl)phosphite, stabilizer[6] | Chemtura |
| PETS | Pentaerythritol tetrastearate, mold release agent, 90% esterified[7] | FACI |

[1] As measured by gel permeation chromatography using bisphenol A polycarbonate standards (+/− 1000 g/mole)
[2] As measured by gel permeation chromatography using polystyrene standards (+/− 1000 g/mole)
[3] Prepared by interfacial polymerization and available from Sabic Innovative Plastics, Mt. Vernon, IN
[4] Prepared from bisphenol A and Sebacic acid by interfacial polymerization and available from Sabic Innovative Plastics, Mt. Vernon, IN
[5] Prepared by melt polymerization and available from Nature Works LLC, Minnetonka, Minnesota Blends 1-7 contain various amounts by percentage weight of PC-2 from SABIC Innovative Plastics (See Table 2 below). Polylactic acid (PLA) resin PLA-1 was blended with PC-2 and has molecular weight of 231,790 g/mole, a polydispersity index (PDI) of 1.93, an onset melting temperature of 138.5° C. as measured by differential scanning calorimetry (DSC), a peak melting temperature of 150° C. as measured by DSC, a heat of fusion of −18.3 J/g as measured by DSC, a glass transition temperature of 59.3° C. as measured using DSC, an onset degradation temperature in air of 332.8° C. as measured by thermo graphic analysis (TGA), and an onset degradation temperature in nitrogen of 333.4° C. as measured by TGA.

In contrast, Blends 8-14 contained no BPA-PC. Rather, these blends contained varying amounts of PAE-PC-1 and was blended with the same PLA resins (PLA-1) as used with the BPA-PC blends (Blends 1-7) (See Table 3 below).

A 0.09 weight % of tris(di-t-butylphenyl)phosphate and 0.3 weight % of PETS (>90% esterified) was used in all blends (Blends 1-14). All formulations were prepared by dry blending and extruded with a Werner Pfeidlere 30 mm twin screw at a temperature profile of 271° C. to 288° C. and cutting into pellets, and injection molding at 282° C. to 305° C.

TABLE 2

| Item Description | Unit | Blend 1 | Blend 2 | Blend 3 | Blend 4 | Blend 5 | Blend 6 | Blend 7 |
| --- | --- | --- | --- | --- | --- | --- | --- | --- |
| PC-2 | % | 99.6 | 97.1 | 94.6 | 92.1 | 89.6 | 87.1 | 84.6 |
| PAE-PC-1 | % | 0 | 0 | 0 | 0 | 0 | 0 | 0 |
| PLA-1 | % | 0 | 2.5 | 5.0 | 7.5 | 10.0 | 12.5 | 15.0 |
| TBPP | % | 0.09 | 0.09 | 0.09 | 0.09 | 0.09 | 0.09 | 0.09 |
| PETS | % | 0.3 | 0.3 | 0.3 | 0.3 | 0.3 | 0.3 | 0.3 |
| Formulation total | % | 100 | 100 | 100 | 100 | 100 | 100 | 100 |
| Biocontent | % | 0.0 | 2.5 | 5 | 7.5 | 10 | 12.5 | 15 |

TABLE 3

| Item Description | Unit | Blend 8 | Blend 9 | Blend 10 | Blend 11 | Blend 12 | Blend 13 | Blend 14 |
|---|---|---|---|---|---|---|---|---|
| PC-2 | % | 0 | 0 | 0 | 0 | 0 | 0 | 0 |
| PAE-PC-1 | % | 99.6 | 97.1 | 94.6 | 92.1 | 89.6 | 87.1 | 84.6 |
| PLA-1 | % | 0 | 2.5 | 5.0 | 7.5 | 10.0 | 12.5 | 15.0 |
| TBPP | % | 0.09 | 0.09 | 0.09 | 0.09 | 0.09 | 0.09 | 0.09 |
| PETS | % | 0.3 | 0.3 | 0.3 | 0.3 | 0.3 | 0.3 | 0.3 |
| Formulation total | % | 100 | 100 | 100 | 100 | 100 | 100 | 100 |
| Biocontent | % | 8.2 | 10.5 | 12.8 | 15.1 | 17.4 | 19.7 | 22 |

The various poly(aliphatic ester)-polycarbonate/PLA blends (Blends 8-14 in Table 3) were screened and compared to BPA-PC/PLA blends (Blends 1-7 in Table 2). A melt volume flow rate test (MVR) was conducted using ISO1133 at 5 kg at 265° C. This data is shown in Tables 4 and 5 for both sets of blends.

As indicated in Tables 4 and 5 the MVR of the corresponding blends (both BPA-PC and poly(aliphatic ester)-polycarbonate based blends) was similar despite different biocontents. Furthermore, there was an increase in ductility and impact strength across poly(aliphatic ester)-polycarbonate/PLA blends as compared to the BPA-PC/PLA blends with comparable levels of PLA.

The addition of more than 10% PLA in BPA-PC created brittle blends with low impact strength (See Blends 5-7). In contrast, up to 15% of PLA in PAE-PC-1 still allowed these blends to maintain their ductility and impact strength (See Blends 9-14). At 0° C., BPC-PC blends with more than 5% PLA were brittle with low impact strength (See Blends 4-7). In contrast, PAE-PC-1/PLA blends at 0° C. did not become brittle until more than 10% PLA was used (See Blends 13 and 14). Therefore, poly(aliphatic ester)-polycarbonate/PLA blends with up to 10% PLA and a high molecular weight polycarbonate maintained their ductility and impact strength at 0° C. while BPA-PC/PLA blends did not maintain their ductility or impact strength at levels of 5% PLA or higher at 0° C. These experiments show that PLA has an impact on ductility and impact strength in BPA-PC polymers, and that PLA can be used in combination with PAE-PC-1 copolymers

TABLE 4

| Characterization Test | Unit | Blend 1 | Blend 2 | Blend 3 | Blend 4 | Blend 5 | Blend 6 | Blend 7 |
|---|---|---|---|---|---|---|---|---|
| Melt Volume Rate—265/5 kg/300 S | $cm^3$/10 min | 8.0 | 8.3 | 9.3 | 9.9 | 10.7 | 12.1 | 11.6 |
| Notched Izod Impact | | | | | | | | |
| Izod Impact at 23° C. | | | | | | | | |
| Ductility | % | 100 | 100 | 100 | 100 | 100 | 0.0 | 0.0 |
| Impact Strength Average | $kJ/m^2$ | 77.1 | 82.9 | 90.8 | 91.3 | 92.3 | 16.2 | 13.9 |
| Izod Impact at 10° C. | | | | | | | | |
| Ductility | % | 100 | 100 | 80 | 100 | 60 | 0.0 | 0.0 |
| Impact Strength Average | $kJ/m^2$ | 80.9 | 80.4 | 76.9 | 94.2 | 64.8 | 13.8 | 13.3 |
| Izod Impact at 0° C. | | | | | | | | |
| Ductility | | 100 | 100 | 100 | 0.0 | 0.0 | 0.0 | 0.0 |
| Impact Strength Average | $kJ/m^2$ | 76.1 | 82.0 | 93.3 | 19.5 | 14.9 | 14.1 | 12.7 |

TABLE 5

| Characterization Test | Unit | Blend 8 | Blend 9 | Blend 10 | Blend 11 | Blend 12 | Blend 13 | Blend 14 |
|---|---|---|---|---|---|---|---|---|
| Melt Volume Rate—265/5 kg/300 S | $cm^3$/10 min | 7.6 | 8.2 | 8.7 | 9.6 | 9.7 | 10.7 | 11.4 |
| Notched Izod Impact | | | | | | | | |
| Izod Impact at 23° C. | | | | | | | | |
| Ductility | % | 100 | 100 | 100 | 100 | 100 | 100 | 80 |
| Impact Strength Average | $kJ/m^2$ | 86.7 | 83.9 | 85.3 | 88.2 | 86.1 | 93.6 | 82.8 |
| Izod Impact at 10° C. | | | | | | | | |
| Ductility | % | 100 | 100 | 100 | 100 | 100 | 80 | 0 |
| Impact Strength Average | $kJ/m^2$ | 81.6 | 82.8 | 86.2 | 83.7 | 89.9 | 76.8 | 14.2 |
| Izod Impact at 0° C. | | | | | | | | |
| Ductility | % | 80 | 100 | 100 | 100 | 100 | 0 | 20 |
| Impact Strength Average | $kJ/m^2$ | 94.4 | 91.6 | 83.1 | 86.7 | 91.4 | 14.3 | 27.0 | while increasing the biocontent and maintaining strength characteristics (ductility and impact strength).

Example 2

BPA-PC vs. Poly(aliphatic ester)-polycarbonate/PLA Blends with Similar Polycarbonate Molecular Weights The impact of PLA on MVR, ductility and impact strength was measured in various polycarbonate blends where the polycarbonates or polycarbonate copolymers have similar low molecular weights. The poly(aliphatic ester)-polycarbonate copolymer used in this example was the low molecular weight copolymer with around 6% sebacic acid and a PC molecular weight around 21,500 g/mole (designated PAE-PC-2). The BPA-PC resin used in this example has a polycarbonate molecular weight around 21,800 g/mole (designated PC-3). Again, the weight-average molecular weight (Mw) of the polycarbonate or sebacic acid containing polyesterpolycarbonates (HFD) were all measured by a standard gel permeation chromatography method using bisphenol A polycarbonate molecular weight standards.

The PAE-PC-2 copolymer or PC-1 polymer were blended with the same polylactic acid polymer (PLA) as used in Example 1 (PLA-1). Blends 15-19 contain various amounts of weight percent of PC-3 with 5, 10, 15, 20, or 25 weight % PLA-1. Blends 20-23 contain various amounts of PAE-PC-2 with 5, 10, 15, or 20 weight % PLA-1. A 0.09 weight % of tris(di-t-butylphenyl)phosphate and 0.3 weight % of PETS (>90% esterified) was used in all blends. All formulations were prepared by dry blending and extruded with a Werner Pfeidlere 30 mm twin screw at a temperature profile of 271° C. to 288° C. and cutting into pellets, and injection molding at 282° C. to 305° C. Table 6 indicates the MVR, ductility and impact strength of Blends 15-23.

A melt volume flow rate rest (MVR) of Blends 15-23 was conducted using ISO1133 at 5 kg/300 seconds both at 240° C. The MVR data indicates that Blends 20-23 (HFD-LM/PLA blends) had higher, more desirable MVRs than Blends 15-19.

The impact performance test using ISO1133 (Notched Izod Measurements) was conducted at two different temperatures (10° C. and 23° C.) for each of Batches 15-24. The PC/PLA blends with more than 5% PLA became brittle and lost impact strength at both 10° C. and 23° C. In contrast, the PAE-PC-2/PLA blends (Blends 20-23) became brittle and lost impact strength when more than 10% PLA was used in the Izod impact strength test at 23° C. However, ductility and impact strength were lost in PAE-PC-2 and BPA-PC based blends with more than 10% PLA. These results show that PLA has an effect on melt volume rate, ductility and impact strength in low molecular polycarbonate blends. Poly(aliphatic ester) low molecular polycarbonate (PAE-PC-2)/PLA blends, however, performed slightly better with regard to impact strength and ductility over similar molecular weight BPA-PC based PLA blends. In particular, PAE-PC-2/PLA blends indicate a much better MVR, impact balance over BPA-PC/PLA blends with much higher bio-contents.

Example 3

BPA-PC/PLA vs. Poly(aliphatic ester) High Molecular Weight polycarbonate/PLA Blends The impact of PLA on MVR, ductility and impact strength was measured in various polycarbonate blends where the polycarbonates or polycarbonate copolymers have similar high molecular weights. The poly(aliphatic ester) polycarbonate copolymer used in this example was the high molecular weight copolymer having around 8.25% sebacic acid and a PC molecular weight of around 36,500 g/mole (PAE-PC-1). The BPA-PC resin used in this example was the high molecular weight resin with a PC molecular weight of around 35,000 g/mole (PC-1). Again, the weight-average molecular weight (Mw) of the BPA-PC and PAE-PC-1 were all measured by standard gel permeation chromatography method using bisphenol A polycarbonate standards.

TABLE 6

| Item Description | Unit | Blend 15 | Blend 16 | Blend 17 | Blend 18 | Blend 19 | Blend 20 | Blend 21 | Blend 22 | Blend 23 |
|---|---|---|---|---|---|---|---|---|---|---|
| PC-3 |  | 94.6 | 89.6 | 84.6 | 79.6 | 74.6 |  |  |  |  |
| PAE-PC-2 | % |  |  |  |  |  | 94.6 | 89.6 | 84.6 | 79.6 |
| PLA-1 | % | 5 | 10 | 15 | 20 | 25 | 5 | 10 | 15 | 20 |
| Tri(di-t-butylphenyl)phosphate (TBPP) | % | 0.09 | 0.09 | 0.09 | 0.09 | 0.09 | 0.09 | 0.09 | 0.09 | 0.09 |
| PETS (>90% esterified) | % | 0.3 | 0.3 | 0.3 | 0.3 | 0.3 | 0.3 | 0.3 | 0.3 | 0.3 |
| Formulation Total |  | 100 | 100 | 100 | 100 | 100 | 100 | 100 | 100 | 100 |
| Biocontent |  | 5 | 10 | 15 | 20 | 25 | 10.7 | 15.4 | 20.1 | 24.8 |
| MVR-ISO1133-240/5 k/300 sec | $cm^3$/10 minutes | 13.1 | 14.1 | 15.6 | 18.1 | 22.3 | 28.4 | 29.5 | 32.5 | 34.4 |
| Notched Izod Impact Test—ISO180 at 23° C. |  |  |  |  |  |  |  |  |  |  |
| Ductility | % | 100 | 40 | 0 | 0 | 0 | 100 | 100 | 20 | 0 |
| Impact Strength—Average | $kJ/m^2$ | 70.9 | 17.7 | 12.0 | 9.9 | 10.8 | 66.5 | 69.8 | 14.0 | 10.1 |
| Notched Izod Test (3 mm thickness)—ISO180 at 10° C. |  |  |  |  |  |  |  |  |  |  |
| Ductility | % | 80 | 0 | 0 | 0 | 0 | 80 | 20 | 0 | 0 |
| Impact Strength—Average | $kJ/m^2$ | 68.3 | 13.5 | 11.5 | 9.6 | 10.9 | 54.6 | 33.5 | 12.3 | 10.6 |

The PAE-PC-1 copolymer or BPA-PC polymer were blended with the same polylactic acid polymer (PLA) as used in Example 1 (PLA-1). Blends 24-28 contain various amounts of weight percent of PC-1 with 5, 10, 15, 20, or 25 weight % PLA-1. Blends 29-33 contain various amounts of PAE-PC-2 with 5, 10, 15, 20, or 25 weight % PLA-1. A 0.09 weight % of tris(di-t-butylphenyl)phosphate and 0.3 weight % of PETS (>90% esterified) was used in all blends. All formulations were prepared by dry blending and extruded with a Werner Pfeidlere 30 mm twin screw at a temperature profile of 271° C. to 288° C. and cutting into pellets, and injection molding at 282° C. to 305° C. Table 7 indicates the MVR, ductility and impact strength of Blends 24-33.

TABLE 7

| Item Description | Unit | Blend 24 | Blend 25 | Blend 26 | Blend 28 | Blend 28 | Blend 29 | Blend 30 | Blend 31 | Blend 32 | Blend 33 |
|---|---|---|---|---|---|---|---|---|---|---|---|
| PC-1 | | 94.6 | 89.6 | 84.6 | 79.6 | 74.6 | | | | | |
| PAE-PC-1 | % | | | | | | 94.6 | 89.6 | 84.6 | 79.6 | 74.6 |
| PLA-1 | % | 5 | 10 | 15 | 20 | 25 | 5 | 10 | 15 | 20 | 25 |
| Tri(di-t-butylphenyl)phosphate (TBPP) | % | 0.09 | 0.09 | 0.09 | 0.09 | 0.09 | 0.09 | 0.09 | 0.09 | 0.09 | 0.09 |
| PETS (>90% esterified) | % | 0.3 | 0.3 | 0.3 | 0.3 | 0.3 | 0.3 | 0.3 | 0.3 | 0.3 | 0.3 |
| Formulation Total | | 100 | 100 | 100 | 100 | 100 | 100 | 100 | 100 | 100 | 100 |
| Biocontent | | 5 | 10 | 15 | 20 | 25 | 12.8 | 17.4 | 22 | 26.6 | 31.2 |
| MVR-ISO1133-240/5 k/300 sec | cm³/10 minutes | 1.6 | 1.7 | 2.2 | 2.7 | 4.4 | 2.9 | 3.4 | 4.1 | 5.2 | 6.2 |
| MVR-1SO1133-265/5 kg/300 sec | cm³/10 minutes | 5.2 | 5.6 | 6.8 | 9.0 | 14.3 | 8.5 | 9.8 | 11.6 | 15.2 | 17.1 |
| Notched Izod Impact Test—ISO180 at 23° C. | | | | | | | | | | | |
| Ductility | % | 100 | 100 | 100 | 20 | 0 | 100 | 100 | 100 | 60 | 0 |
| Impact Strength—Average | kJ/m² | 86.2 | 92.3 | 80.2 | 31.2 | 16.5 | 86.3 | 92.1 | 93.8 | 53.9 | 16.6 |
| Notched Izod Test (3 mm thickness)—ISO180 at 10° C. | | | | | | | | | | | |
| Ductility | % | 100 | 100 | 0 | 0 | 0 | 100 | 100 | 100 | 0 | 0 |
| Impact Strength—Average | kJ/m² | 86.6 | 91.8 | 18.0 | 15.4 | 14.1 | 86.8 | 91.5 | 91.8 | 16.3 | 14.3 |
| Notched Izod Test (3 mm thickness)—ISO180 at 0° C. | | | | | | | | | | | |
| Ductility | % | 100 | 0 | 0 | 0 | 0 | 100 | 100 | 0 | 0 | 0 |
| Impact Strength—Average | kJ/m² | 84.5 | 20.1 | 15.3 | 13.7 | 13.3 | 85.5 | 90.9 | 18.0 | 13.8 | 13.1 |

A melt volume flow rate rest (MVR) of Blends 24-33 was conducted using ISO1133 at 5 kg/300 seconds at 240° C. and 265° C. The MVR data again indicates that the PAE-PC-1/PLA blends (Blends 29-33) had higher, more desirable MVRs than PC-1/PLA blends (Blends 24-28). The high molecular weight PAE-PC-1 allowed MVR to be measured even with the addition of 25% PLA into the blend (See Blend 33).

The impact performance test using ISO1133 (Notched Izod Measurements) was conducted at three different temperatures (0° C., 10° C. and 23° C.) for each of Batches 24-33. The higher molecular weight polycarbonate increased ductility and impact strength across all the PLA based blends. In particular, good ductility and impact strength were maintained in the PC-1/PLA blends 24-28 with up to 15% PLA at 23° C., 10% PLA at 10° C., and 5% PLA at 5° C. PAE-PC-1/PLA blends performed even better. Good ductility and impact strength were maintained in the PAE-PC/PLA blends 29-33 with up to 20% PLA at 23° C., 15% PLA at 10° C., and 10% PLA at 5° C. These results show that higher molecular weight polycarbonate blends counter PLA's effect on melt volume rate, ductility and impact strength as compared to lower polycarbonate based PLA blends. Again, however, poly (aliphatic ester)-polycarbonate/PLA blends with high molecular weight polycarbonate performed better with regard to impact strength, ductility and MVR than high molecular weigh BPA-polycarbonate (PC-1/PLA) blends at the same or higher bio-contents.

In one embodiment, we claim a blended composition comprising: (a) one or more polycarbonates wherein at least one of the polycarbonates is a poly(aliphatic ester)-polycarbonate comprising: (i) soft block ester units of the formula:

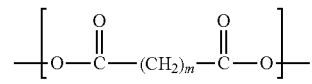

wherein m is 4 to 40; and (ii) at least one unit derived from bisphenol A; and (b) a polylactide polymer having the following structural unit:

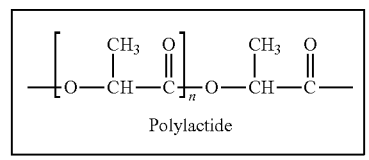

Polylactide wherein n is between 1000 and 3000; wherein the composition has an overall biocontent of at least 10% according to ASTM D6866.

In another embodiment, we claim a blended composition comprising: (a) a poly(aliphatic ester)-polycarbonate comprising (i) soft block ester units of the formula:

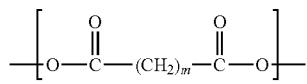

wherein m is 4 to 18; (ii) at least one unit derived from sebacic acid; and (iii) at least one unit derived from bisphenol A; and; (b) a polylactide polymer having the following structural unit:

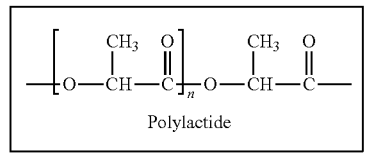
Polylactide wherein n is between 1000 and 3000; wherein the poly(aliphatic ester)-polycarbonate has (a) a molecular weight of 16,000 to 27,000 g/mole [+/−1000 g/mole] as measured by gel permeation chromatography using bisphenol A polycarbonate standards and 5.0 mole % (of total composition) to 7.0 mole % sebacic acid; or (b) a molecular weight of 30,000 to 42,000 g/mole [+/−1000 g/mole] as measured by gel permeation chromatography using bisphenol A polycarbonate standards, and 7.0 mole % to 9.0 mole % sebacic acid, wherein the polylactide content is 2.5 to 25 weight % of (a) and (b), and a molecular weight of 160,000 g/mole to 200,000 g/mole [+/−1000 g/mole] as measured by gel permeation chromatography using polystyrene standards; wherein the composition has an overall biocontent of at least 10% according to ASTM D6866.

In any of the abovementioned embodiments: (i) at least one unit of the poly(aliphatic ester)-polycarbonate is derived from sebacic acid; and m is 4 to 18; and/or (ii) the sebacic acid derived polycarbonate biocontent is at least 5% according to ASTM D6866; and/or (iii) the soft block ester has a glass transition temperature of 120 to 140° C.; and/or (iv) m of the soft block ester of (i) is 8 to 10; and/or (v) the composition comprises 2 to 10 weight % soft block ester units; and/or (vi) the composition comprises 75 to 95 weight % poly(aliphatic ester)-polycarbonate; and/or (vii) the composition comprises 5 to 45 weight % of polylactide polymer; and/or (viii) at least one poly(aliphatic ester)-polycarbonate has (a) a molecular weight of 16,000 to 27,000 g/mole [+/−1000 g/mole] as measured by gel permeation chromatography using bisphenol A polycarbonate standards and 5.0 mole % (of total composition) to 7.0 mole % sebacic acid; or (b) a molecular weight of 30,000 to 42,000 g/mole [+/−1000 g/mole] as measured by gel permeation chromatography using bisphenol A polycarbonate standards, and 7.0 mole % to 9.0 mole % sebacic acid; and/or (ix) at least one poly(aliphatic ester)-polycarbonate of (a) is at a molecular weight of 19,000 to 24,000 g/mole [+/−1000 g/mole] as measured by gel permeation chromatography using bisphenol A polycarbonate standards; and/or (x) at least one poly(aliphatic ester)-polycarbonate of (b) is at a molecular weight of 33,000 to 39,000 g/mole [+/−1000 g/mole] as measured by gel permeation chromatography using bisphenol A polycarbonate standards; and/or (xi) the polylactide content is 5 to 25 weight % of (a) and (b), and a molecular weight of 100,000 to 300,000 g/mole [+/−1000 g/mole], 150,000 to 250,000 g/mole [+/−1000 g/mole], or 175,000 to 225,000 g/mole [+/−1000 g/mole] as measured by gel permeation chromatography using polystyrene standards; and/or (xii) the polylactide content is 5 to 25 weight % of (a) and (b), and a molecular weight of 160,000 g/mole to 200,000 g/mole [+/−1000 g/mole] as measured by gel permeation chromatography using polystyrene standards; and/or (xiii) the polylactide has a melting point (Tm) of 165° C. [+/−10° C.] and a glass transition temperature of 60° C. [+/−10° C.]; and/or (xiv) the composition has a melt volume rate of 28 cm³/10 minutes to 35 cm³/10 minutes according to ISO1133 (5 kg/5 minutes at 240° C.); and/or (xv) the polylactide content is 5 to 25 weight % of (a) and (b) and a molecular weight ranging of 160,000 g/mole to 200,000 g/mole as measured by gel permeation chromatography using polystyrene standards; and/or (xvi) the composition has a melt volume rate of 2.50 cm³/10 minutes to 6.50 cm³/10 minutes according to ISO1133 (5 kg/5 minutes at 240° C.); and/or (xvii) the polylactide content is 2.5 to 15 weight % of (a) and (b); and/or (xviii) the composition has a melt volume rate of 7.50 cm³/10 minutes to 18.00 cm³/10 minutes according to ISO1133 (5 kg/5 minutes at 265° C.); and/or (xix) the composition has an impact strength average of greater than 60 kJ/m² [+/−5 kJ/m²] or greater than 50 kJ/m² [+/−5 kJ/m²] at 23° C. according to ISO 180; and/or (xx) the composition has an impact strength average of greater than 80 kJ/m² or greater than 85 kJ/m² [+/−5 kJ/m²] at 10° C. according to ISO 180; and/or (xxi) the composition has an overall biocontent of at least 15%, at least 20%, or at least 30% according to ASTM D6866; and/or (xxii) each of the poly(aliphatic ester)-polycarbonates of (a) contains less than 5 mole percent of anhydride as determined by proton nuclear magnetic resonance; and/or (xxiii) the composition further comprising other additives such as heat stabilizers, mold release agents, glass or colorants; and/or (xxiv) at least one poly(aliphatic ester)-polycarbonate of (a) is at a molecular weight of 19,000 to 24,000 g/mole [+/−1000 g/mole] as measured by gel permeation chromatography using bisphenol A polycarbonate standard; and/or (xxv) at least one poly(aliphatic ester)-polycarbonate of (b) is at a molecular weight of 33,000 to 39,000 g/mole [+/− 1000 g/mole] as measured by gel permeation chromatography using bisphenol A polycarbonate standards; and/or (xxvi) the polylactide content is 5 to 15 weight % of (a) and (b); and/or (xxvii) the composition has a melt volume rate of 7.50 cm³/10 minutes to 12.00 cm³/10 minutes according to ISO1133 (5 kg/5 minutes at 265° C.); and/or (xxviii) the composition further comprises an isosorbide containing polymer; and/or the composition has an overall biocontent of 10 to 30% according to ASTM D6866; and/or the composition is formed into an article; and/or the composition is formed into an article, wherein the article is a computer or business machine housing, a housing for a hand-held electronic device, a component of a lighting fixture or home appliance, a component of a medical application or device, or a component of an interior or exterior component of an automobile.

What is claimed is:
1. A blended composition comprising:
   (a) one or more polycarbonates wherein at least one of the polycarbonates is a poly(aliphatic ester)-polycarbonate comprising:
      (i) soft block ester units of the formula

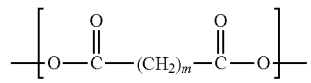

wherein m is 4 to 40; and
      (ii) at least one unit derived from bisphenol A; and
   (b) a polylactide polymer having the following structural unit wherein n is between 1000 and 3000;

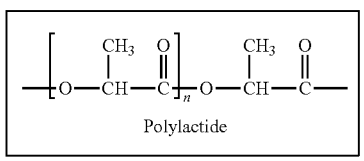
Polylactide wherein the composition has an overall biocontent of at least 10 weight % according to ASTM D6866.

2. The composition of claim 1, wherein at least one unit of the poly(aliphatic ester)-polycarbonate is derived from sebacic acid; and m is 4 to 18.

3. The composition of claim 1, wherein the sebacic acid derived polycarbonate biocontent is at least 5 weight % according to ASTM D6866.

4. The composition of claim 1, wherein the soft block ester has a glass transition temperature of 120 to 140° C.

5. The composition of claim 1, wherein m of the soft block ester of (i) is 8 to 10.

6. The composition of claim 1, wherein the composition comprises 2 to 10 weight % soft block ester units.

7. The composition of claim 1, wherein the composition comprises 75 to 95 weight % poly(aliphatic ester)-polycarbonate.

8. The composition of claim 1, wherein the composition comprises 5 to 45 weight % of polylactide polymer.

9. The composition of claim 1, wherein at least one poly(aliphatic ester)-polycarbonate has (a) a molecular weight of 16,000 to 27,000 g/mole [$^{+/-}$1000 g/mole] as measured by gel permeation chromatography using bisphenol A polycarbonate standards and 5.0 mole % (of total composition) to 7.0 mole % sebacic acid; or (b) a molecular weight of 30,000 to 42,000 g/mole [$^{+/-}$1000 g/mole] as measured by gel permeation chromatography using bisphenol A polycarbonate standards, and 7.0 mole % to 9.0 mole % sebacic acid.

10. The composition of claim 9, wherein at least one poly(aliphatic ester)-polycarbonate of (a) is at a molecular weight of 19,000 to 24,000 g/mole [$^{+/-}$1000 g/mole] as measured by gel permeation chromatography using bisphenol A polycarbonate standards.

11. The composition of claim 9, wherein at least one poly(aliphatic ester)-polycarbonate of (b) is at a molecular weight of 33,000 to 39,000 g/mole [$^{+/-}$1000 g/mole] as measured by gel permeation chromatography using bisphenol A polycarbonate standards.

12. The composition of claim 9, wherein the polylactide content is 5 to 25 weight % of (a) and (b), and a molecular weight of 100,000 to 300,000 g/mole [$^{+/-}$1000 g/mole], 150,000 to 250,000 g/mole [$^{+/-}$1000 g/mole], or 175,000 to 225,000 g/mole [$^{+/-}$1000 g/mole] as measured by gel permeation chromatography using polystyrene standards.

13. The composition of claim 12, wherein the polylactide content is 5 to 25 weight % of (a) and (b), and a molecular weight of 160,000 g/mole to 200,000 g/mole [$^{+/-}$1000 g/mole] as measured by gel permeation chromatography using polystyrene standards.

14. The composition of claim 12, wherein the polylactide has a melting point (Tm) of 165° C. [$^{+/-}$10° C.] and a glass transition temperature of 60° C. [$^{+/-}$10° C.].

15. The composition of claim 10, wherein the composition has a melt volume rate of 28 cm$^3$/10 minutes to 35 cm$^3$/10 minutes according to ISO1133 (5 kg/5 minutes at 240° C.).

16. The composition of claim 15, wherein the polylactide content is 5 to 25 weight % of (a) and (b) and a molecular weight ranging of 160,000 g/mole to 200,000 g/mole as measured by gel permeation chromatography using polystyrene standards.

17. The composition of claim 11, wherein the composition has a melt volume rate of 2.50 cm$^3$/10 minutes to 6.50 cm$^3$/10 minutes according to ISO1133 (5 kg/5 minutes at 240° C.).

18. The composition of claim 17, wherein the polylactide content is 2.5 to 15 weight % of (a) and (b).

19. The composition of claim 11, wherein the composition has a melt volume rate of 7.50 cm$^3$/10 minutes to 18.00 cm$^3$/10 minutes according to ISO1133 (5 kg/5 minutes at 265° C.).

20. The composition of claim 15, wherein the composition has an impact strength average of greater than 60 kJ/m$^2$ [$^{+/-}$5 kJ/m$^2$] at 23° C. according to ISO 180.

21. The composition of claim 17, wherein the composition has an impact strength average of greater than 50 kJ/m$^2$ [$^{+/-}$5 kJ/m$^2$] at 23° C. according to ISO 180.

22. The composition of claim 19, wherein the composition has an impact strength average of greater than 85 kJ/m$^2$ [$^{+/-}$5 kJ/m$^2$] at 10° C. according to ISO 180.

23. The composition of claim 1, wherein the composition has an overall biocontent of at least 15 weight % according to ASTM D6866.

24. The composition of claim 23, wherein the composition has an overall biocontent of at least 20 weight % according to ASTM D6866.

25. The composition of claim 24, wherein the composition has an overall biocontent of at least 30 weight % according to ASTM D6866.

26. The composition of claim 1, wherein each of the poly(aliphatic ester)-polycarbonates of (a) contains less than 5 mole percent of anhydride as determined by proton nuclear magnetic resonance.

27. The composition of claim 1, further comprising at least one of heat stabilizers, mold release agents, glass or colorants.

28. An article formed from the composition of claim 1, wherein the composition has an overall biocontent of 10 to 30 weight % according to ASTM D6866.

29. The article of claim 28, wherein the article is a computer or business machine housing, a housing for a hand-held electronic device, a component of a lighting fixture or home appliance, a component of a medical application or device, or a component of an interior or exterior component of an automobile.

30. A blended composition comprising:
(a) a poly(aliphatic ester)-polycarbonate comprising
(i) soft block ester units of the formula

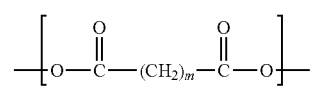

wherein m is 4 to 18;
(ii) at least one unit derived from sebacic acid; and
(ii) at least one unit derived from bisphenol A; and;
(b) a polylactide polymer having the following structural unit wherein n is between 1000 and 3000;

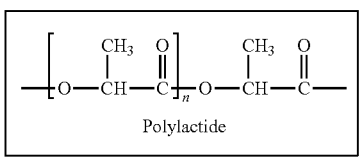

wherein the poly(aliphatic ester)-polycarbonate has (a) a molecular weight of 16,000 to 27,000 g/mole [+/−1000 g/mole] as measured by gel permeation chromatography using bisphenol A polycarbonate standards and 5.0 mole % (of total composition) to 7.0 mole % sebacic acid; or (b) a molecular weight of 30,000 to 42,000 g/mole [+/−1000 g/mole] as measured by gel permeation chromatography using bisphenol A polycarbonate standards, and 7.0 mole % to 9.0 mole % sebacic acid, wherein the polylactide content is 2.5 to 25 weight % of (a) and (b), and a molecular weight of 160,000 g/mole to 200,000 g/mole [+/−1000 g/mole] as measured by gel permeation chromatography using polystyrene standards;

wherein the composition has an overall biocontent of at least 10 weight % according to ASTM D6866.

31. The composition of claim 30, wherein at least one poly(aliphatic ester)-polycarbonate of (a) is at a molecular weight of 19,000 to 24,000 g/mole [+/−1000 g/mole] as measured by gel permeation chromatography using bisphenol A polycarbonate standards.

32. The composition of claim 30, wherein at least one poly(aliphatic ester)-polycarbonate of (b) is at a molecular weight of 33,000 to 39,000 g/mole [+/−1000 g/mole] as measured by gel permeation chromatography using bisphenol A polycarbonate standards.

33. The composition of claim 31, wherein the composition has a melt volume rate of 28 cm$^3$/10 minutes to 35 cm$^3$/10 minutes according to ISO1133 (5 kg/5 minutes at 240° C.).

34. The composition of claim 32, wherein the composition has a melt volume rate of 2.50 cm$^3$/10 minutes to 6.50 cm$^3$/10 minutes according to ISO1133 (5 kg/5 minutes at 240° C.).

35. The composition of claim 30, wherein the polylactide content is 5 to 15 weight % of (a) and (b).

36. The composition of claim 33, wherein the composition has a melt volume rate of 7.50 cm$^3$/10 minutes to 12.00 cm$^3$/10 minutes according to ISO1133 (5 kg/5 minutes at 265° C.).

37. The composition of claim 33, wherein the composition has an impact strength average of greater than 60 kJ/m$^2$ [+/−5 kJ/m$^2$] at 23° C. according to ISO 180.

38. The composition of claim 34, wherein the composition has an impact strength average of greater than 50 kJ/m$^2$ [+/−5 kJ/m$^2$] at 23° C. according to ISO 180.

39. The composition of claim 35, wherein the composition has an impact strength average of greater than 80 kJ/m$^2$ [+/−5 kJ/m$^2$] at 10° C. according to ISO 180.

40. The composition of claim 30, wherein the composition has an overall biocontent of at least 15 weight % according to ASTM D6866.

41. The composition of claim 30, wherein the composition has an overall biocontent of at least 20 weight % according to ASTM D6866.

42. The composition of claim 30, wherein the composition has an overall biocontent of at least 30 weight % according to ASTM D6866.

43. The composition of claim 1, wherein the composition further comprises an isosorbide containing polymer.

44. The composition of claim 30, wherein the composition further comprises an isosorbide containing polymer.

\* \* \* \* \*